(12) United States Patent
Chigasaki et al.

(10) Patent No.: US 7,724,505 B2
(45) Date of Patent: May 25, 2010

(54) FRONT PANEL ASSEMBLY FOR USE ON CASING BODY OF ELECTRONIC DEVICE AND CASING OF VEHICLE-MOUNTED ELECTRONIC DEVICE

(75) Inventors: Hiroyuki Chigasaki, Tokyo (JP); Yukihiro Horikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 994 days.

(21) Appl. No.: 11/448,911

(22) Filed: Jun. 8, 2006

(65) Prior Publication Data
US 2007/0015487 A1 Jan. 18, 2007

(30) Foreign Application Priority Data
Jun. 9, 2005 (JP) .............................. 2005-169175

(51) Int. Cl.
*H05K 7/20* (2006.01)
(52) U.S. Cl. .................. 361/679.01; 361/724; 361/727; 307/9.1; 307/10.1
(58) Field of Classification Search ............ 361/679.01; 455/346
See application file for complete search history.

(56) References Cited

U.S. PATENT DOCUMENTS

| | | | | |
|---|---|---|---|---|
| 5,177,730 | A * | 1/1993 | Utsugi ........................ | 720/646 |
| 5,359,230 | A * | 10/1994 | Namiki et al. .............. | 307/10.1 |
| 5,847,685 | A * | 12/1998 | Otsuki ........................ | 345/87 |
| 5,848,042 | A * | 12/1998 | Takahashi et al. ........... | 720/647 |
| 6,241,300 | B1 * | 6/2001 | Suzuki ....................... | 296/37.8 |
| 6,747,364 | B1 * | 6/2004 | Shibuya et al. ................ | 307/9.1 |
| 7,012,801 | B2 * | 3/2006 | Shimizu ................. | 361/679.01 |
| 7,119,455 | B2 * | 10/2006 | Kishi et al. ................... | 307/9.1 |
| 7,134,877 | B2 * | 11/2006 | Matumoto et al. .......... | 434/379 |
| 2002/0101117 | A1 * | 8/2002 | Shibuya ...................... | 307/9.1 |
| 2002/0135231 | A1 * | 9/2002 | Miura ....................... | 307/10.1 |
| 2003/0027545 | A1 * | 2/2003 | Tobishima ................... | 455/346 |
| 2003/0193871 | A1 * | 10/2003 | Tobishima et al. ......... | 369/75.1 |
| 2003/0201671 | A1 * | 10/2003 | Tobishima et al. ......... | 307/10.1 |
| 2005/0071051 | A1 | 3/2005 | Leung | |
| 2005/0236527 | A1 * | 10/2005 | Takagi ....................... | 248/27.1 |

FOREIGN PATENT DOCUMENTS

| | | |
|---|---|---|
| EP | 1 195 284 A2 | 4/2002 |
| EP | 1 283 132 A2 | 2/2003 |
| JP | 2003-272362 | 9/2003 |

* cited by examiner

*Primary Examiner*—Jayprakash N Gandhi
*Assistant Examiner*—Anthony Q Edwards
(74) *Attorney, Agent, or Firm*—Oblon, Spivak, McClelland, Maier & Neustadt, L.L.P.

(57) ABSTRACT

A front panel assembly for being detachably mounted on a front face of a casing body of a vehicle-mounted electronic device, the front face having a recording medium insertion slot, including: a panel frame adapted to be detachably mounted on the front face of the casing body; a lid supported on the panel frame for movement in directions to open and close the slot while the panel frame is mounted on the front face of the casing body; the panel frame having a rear face facing the front face of the casing body while the panel frame is mounted on the front face of the casing body; a slide member mounted on the rear face for reciprocating movement along the rear face; and an interlink mechanism mounted on the panel frame for moving the lid in the directions to open and close the recording medium insertion slot in response to reciprocating movement of the slide member.

20 Claims, 35 Drawing Sheets

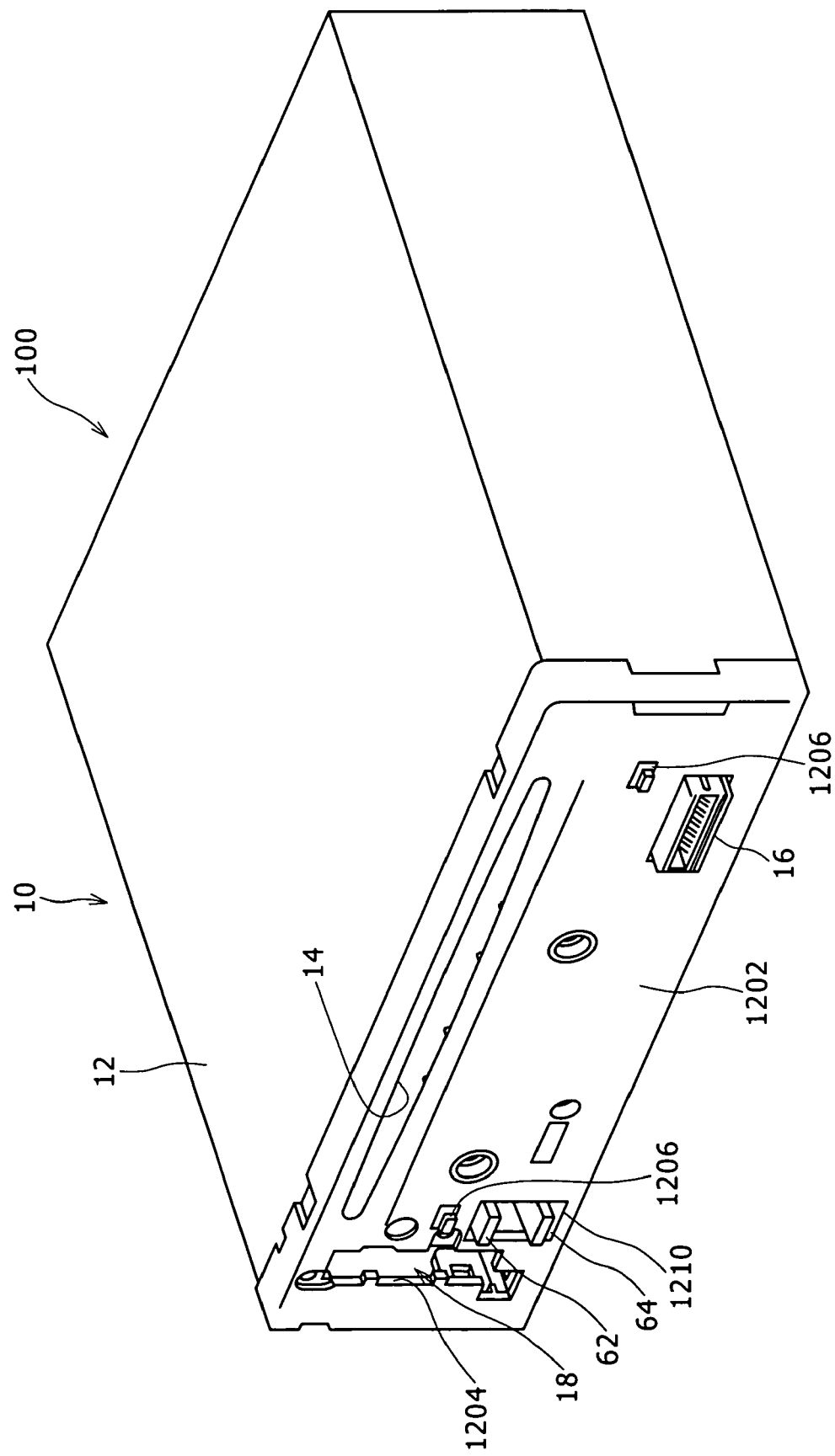

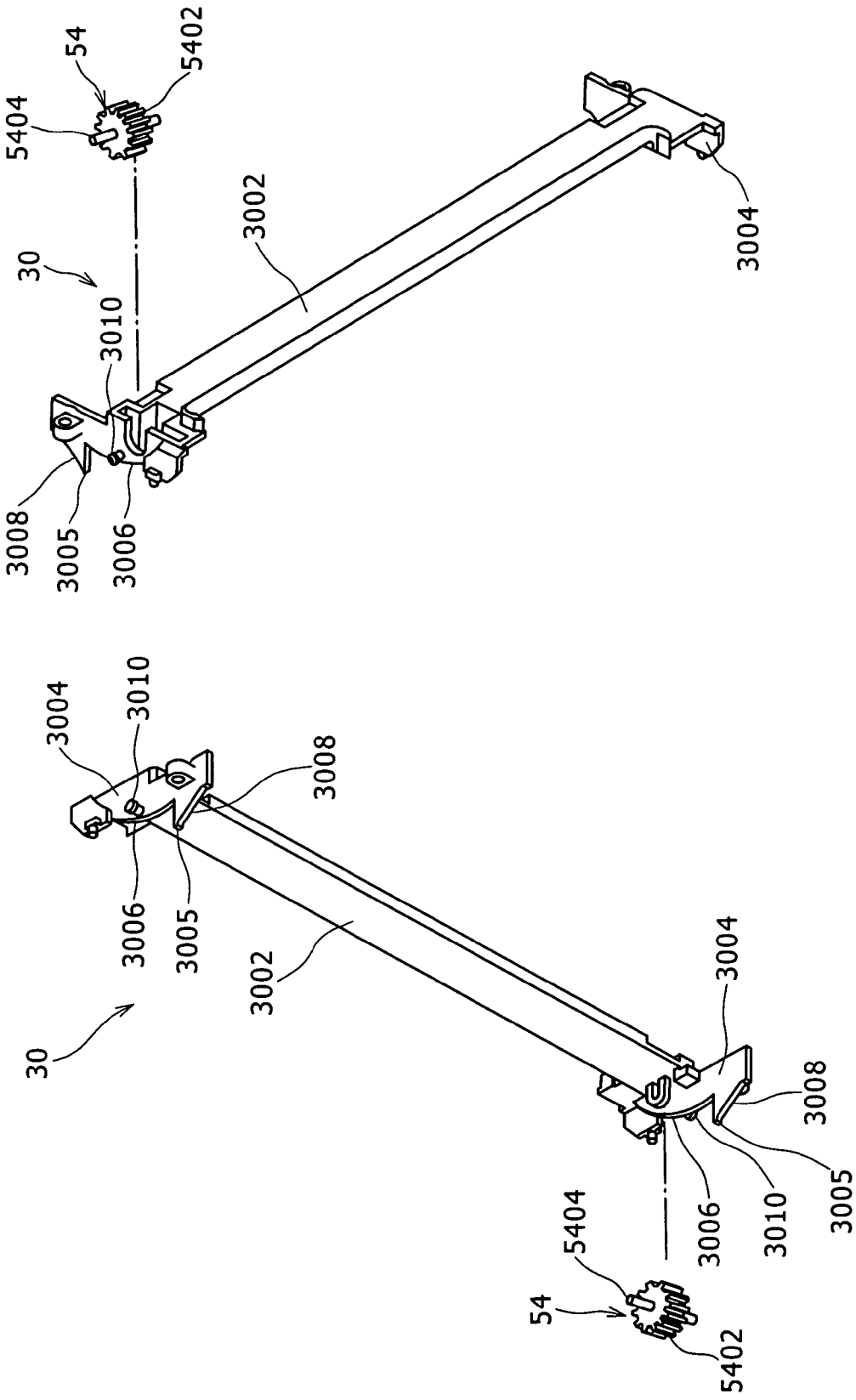

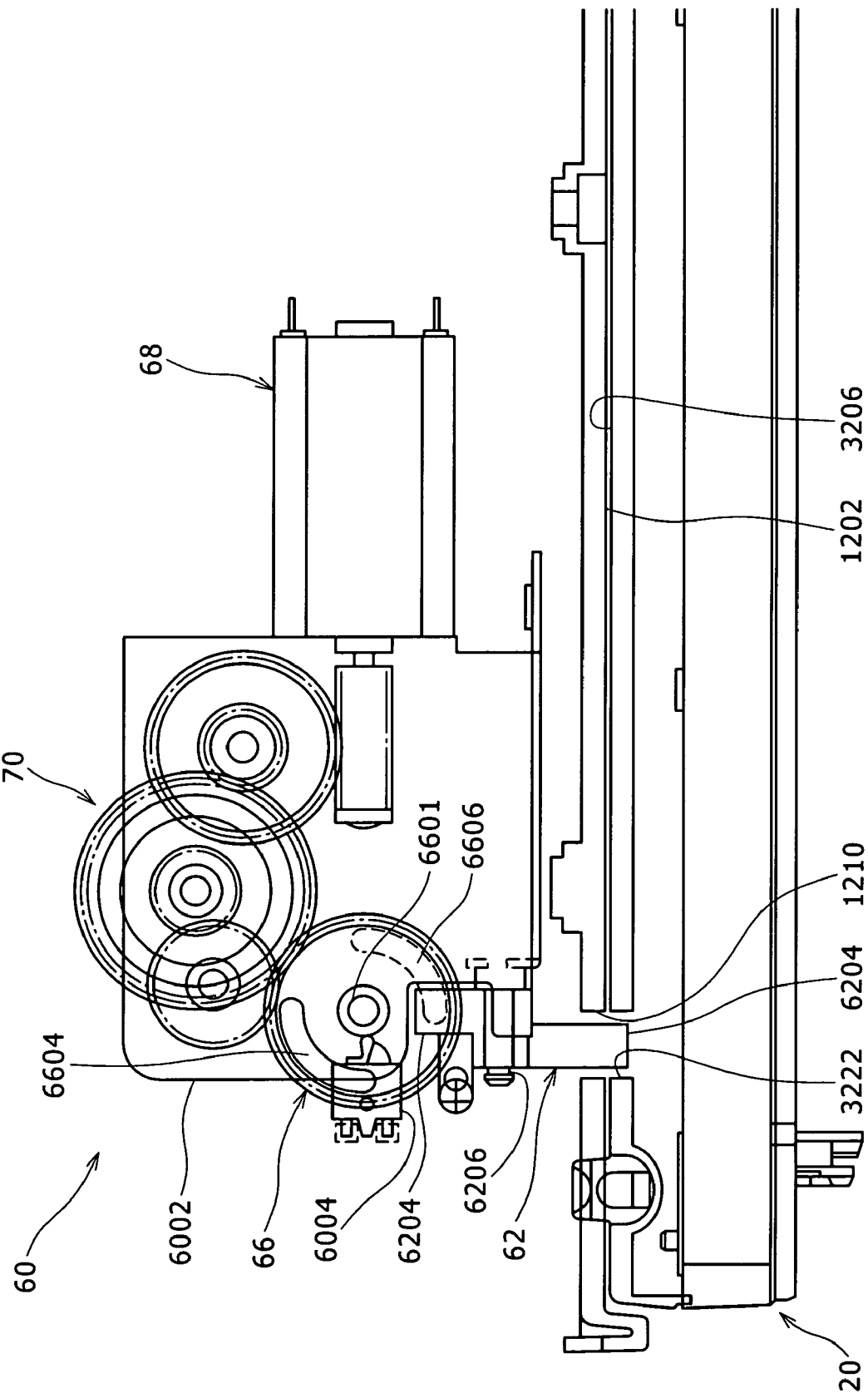

FRONT PANEL ASSEMBLY FOR USE ON CASING BODY OF ELECTRONIC DEVICE AND CASING OF VEHICLE-MOUNTED ELECTRONIC DEVICE

CROSS REFERENCES TO RELATED APPLICATIONS

The present invention contains subject matter related to Japanese Patent Application JP 2005-169175 filed with the Japanese Patent Office on Jun. 9, 2005, the entire contents of which being incorporated herein by reference.

BACKGROUND OF THE INVENTION

1. Field of the Invention

The present invention relates to a front panel assembly for use on a casing body of an electronic device and a casing of a vehicle-mounted electronic device.

2. Description of the Related Art

Vehicle-mounted electronic devices for reproducing disk-shaped recording mediums such as CDs and MDs inserted therein have been used in the art.

One known vehicle-mounted electronic device has a casing including a casing body mounted in a car dashboard or the like and a front panel assembly detachably mounted on the front face of the casing body. When the driver leaves the car, the driver removes and carries the front panel assembly for the purpose of theft prevention. For details, reference should be made to Japanese Patent Laid-open No. Hei 9-7359.

The vehicle-mounted electronic device also has a reproducing mechanism disposed in the casing body for reproducing a recording medium. The casing body has a recording medium insertion slot defined in its front face for removably inserting therethrough a disk-shaped recording medium such as a CD or an MD. The front panel assembly has a lid for selectively opening and closing the recording medium insertion slot, various control switches, and a display panel for displaying various items of information. Even if the casing body with the reproducing mechanism housed therein is removed and stolen by someone else, it may not function as the electronic device due to the lack of the front panel assembly. In this manner, the vehicle-mounted electronic device is protected against theft.

SUMMARY OF THE INVENTION

The casing body incorporates an actuating mechanism for moving the lid of the front panel assembly in a direction to open the recording medium insertion slot. Since the front panel assembly is detachably mounted on the casing body, it is important to operatively connect the lid of the front panel assembly and the actuating mechanism of the casing body to each other through a simple and reliable structure.

The present invention has been made in view of the above. There is a need for the present invention to provide a front panel assembly for use on a casing body of an electronic device which is effective to structurally simplify an actuating mechanism incorporated in the casing body and can be reliably operatively connected to the actuating mechanism incorporated in the casing body, and a casing of a vehicle-mounted electronic device which includes such a front panel assembly.

To satisfy the above need, there is provided in accordance with the present invention a front panel assembly for being detachably mounted on a front face of a casing body of a vehicle-mounted electronic device, the front face having a recording medium insertion slot defined therein, including a panel frame adapted to be detachably mounted on the front face of the casing body, a lid supported on the panel frame for movement in directions to open and close the recording medium insertion slot while the panel frame is mounted on the front face of the casing body, the panel frame having a rear face facing the front face of the casing body while the panel frame is mounted on the front face of the casing body, a slide member mounted on the rear face for reciprocating movement along the rear face, and an interlink mechanism mounted on the panel frame for moving the lid in the directions to open and close the recording medium insertion slot in response to reciprocating movement of the slide member.

According to the present invention, there is also provided a casing of a vehicle-mounted electronic device, including a casing body having a recording medium insertion slot defined in a front face, a front panel assembly for being detachably mounted on the front face of the casing body, the front panel assembly including a panel frame detachably mounted on the front face of the casing body, and a lid supported on the panel frame for movement in directions to open and close the recording medium insertion slot while the panel frame is mounted on the front face of the casing body, the panel frame having a rear face facing the front face of the casing body while the panel frame is mounted on the front face of the casing body, a slide member mounted on the rear face for reciprocating movement along the rear face, and an interlink mechanism mounted on the panel frame for moving the lid in the directions to open and close the recording medium insertion slot in response to reciprocating movement of the slide member.

According to the present invention, there is further provided a casing of a vehicle-mounted electronic device, including a casing body having a recording medium insertion slot defined in a front face, a front panel assembly for being detachably mounted on the front face of the casing body, the front panel assembly including a panel frame detachably mounted on the front face of the casing body, and a lid supported on the panel frame for movement in directions to open and close the recording medium insertion slot while the panel frame is mounted on the front face of the casing body, the panel frame having a rear face facing the front face of the casing body while the panel frame is mounted on the front face of the casing body, a slide member mounted on the rear face for reciprocating movement along the rear face, an interlink mechanism mounted on the panel frame for moving the lid in the directions to open and close the recording medium insertion slot in response to reciprocating movement of the slide member, an engaging member mounted on the front face of the casing body, for engaging the slide member while the front panel assembly is connected to the casing body, and an actuating mechanism mounted on the casing body, for reciprocally moving the engaging member in directions to reciprocally move the slide member.

According to the present invention, the slide member is mounted on the rear face of the front panel assembly, and the interlink mechanism moves the lid in the directions to open and close the recording medium insertion slot in response to reciprocating movement of the slide member. With a simple mechanism being provided in the casing body for reciprocally moving the slide member, the recording medium insertion slot can selectively be opened and closed, and the lid and the actuating mechanism can easily and reliably be coupled to each other. Therefore, the arrangement for selectively opening and closing the recording medium insertion slot is simplified, and the coupling between the lid and the actuating mechanism is made reliable.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 is a perspective view of a casing body of the casing;

FIG. 4A is a perspective view of a guide plate as viewed obliquely from below in front and FIG. 4B is a perspective view of the guide plate as viewed obliquely from below in rear;

FIG. 32 is a plan view of an actuating mechanism disposed in the casing body of the vehicle-mounted electronic device;

DETAILED DESCRIPTION OF THE PREFERRED EMBODIMENTS

A vehicle-mounted electronic device referred to in the embodiment of the present invention is a car audio system for reproducing an optical disk (disk-shaped recording medium) such as a CD or an MD inserted therein.

Figure 1A:
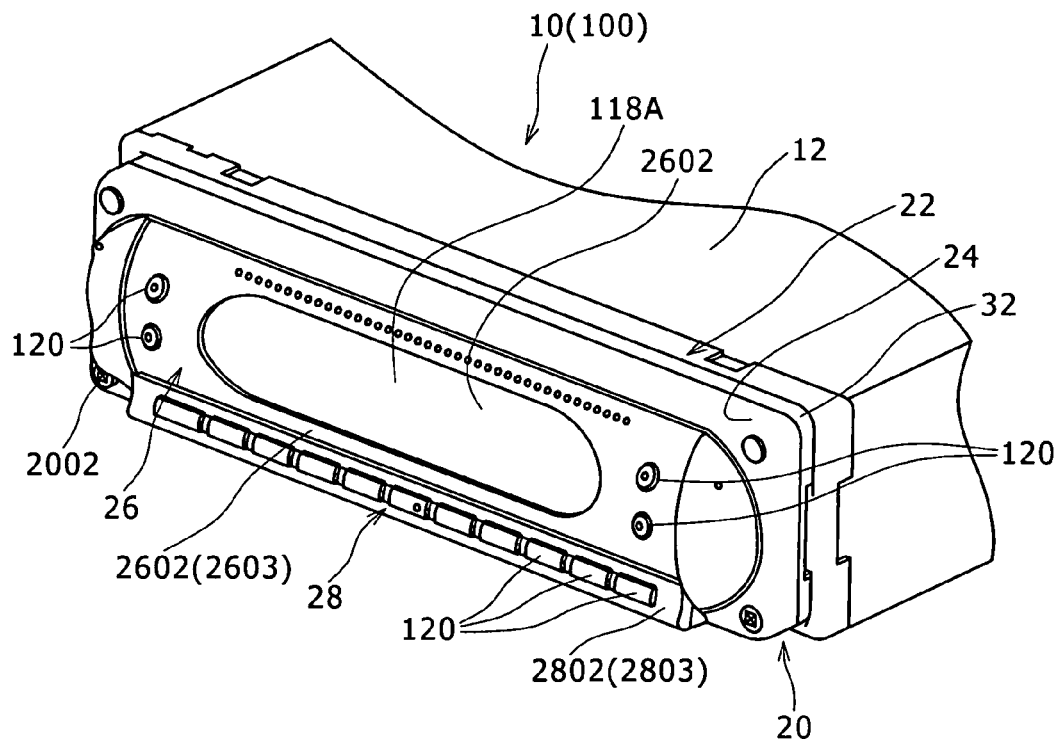
FIG. 1A is a fragmentary perspective view of a casing of a vehicle-mounted electronic device according to an embodiment of the present invention, the view showing the casing with a recording medium insertion slot being closed
Figure 1B:
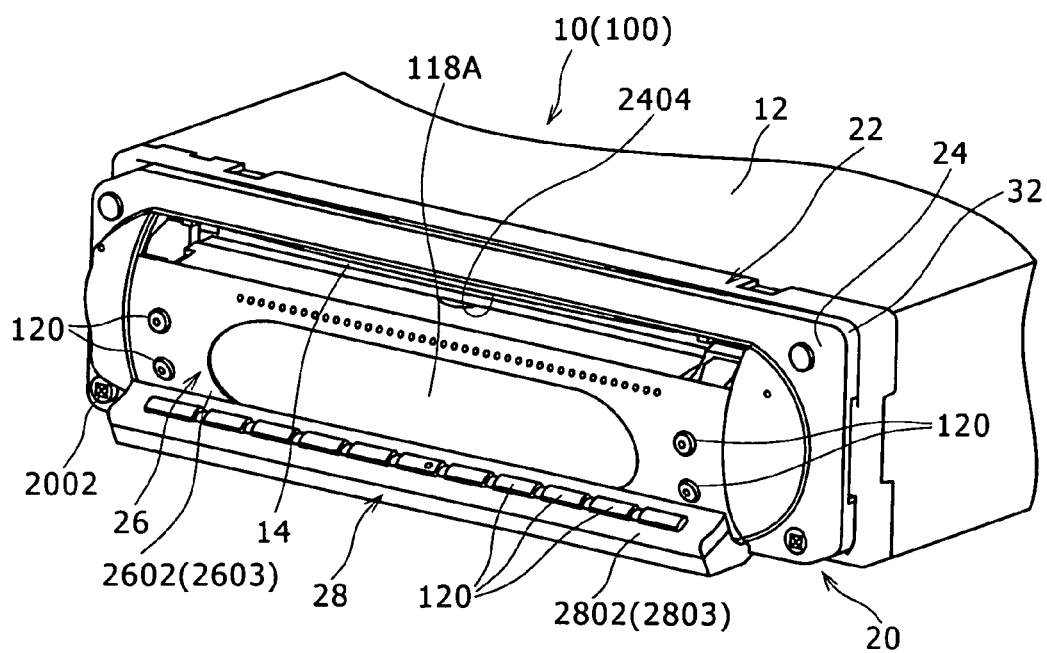
FIG. 1B is a fragmentary perspective view of the casing with the recording medium insertion slot being open.

As shown in FIGS. 1A, 1B, and 2, the vehicle-mounted electronic device, generally denoted by 100, has a casing 10 including a casing body 12 mounted in a car dashboard or the like and a front panel assembly 20 detachably mounted on a front face 1202 of the casing body 12.

In the description below, "left" and "right" refer respectively to the left and the right as viewed from the front of the casing 10, and "front" and "rear" refer respectively to the front of the casing 10 and the rear of the casing 10.

As shown in FIG. 2, the casing body 12 is in the form of a flat box of rectangular plates having a vertical height, a width between the left and right edges which is greater than the height, and a length between the front and rear ends. The casing body 12 has a rectangular front face 1202 that is elongate between the front and rear ends.

The front face 1202 has a recording medium insertion slot 14 defined in an upper portion. The recording medium insertion slot 14 extends horizontally along an upper edge of the front face 1202 for the passage therethrough of an optical disk 102 as it is inserted into and ejected out of the casing body 12.

A casing body connector 16 is mounted on a right lower portion of the front face 1202. An engaging and disengaging mechanism 18 is disposed in an opening 1204 which is defined in a left side portion of the front face 1202. Two horizontally spaced positioning teeth 1206 project from a vertically intermediate portion of the front face 1202.

A vertically elongate opening 1210 is defined in the front face 1202 on the right side of the opening 1204. First and second arms 62, 64 are disposed in the opening 1210 therethrough.

The front panel assembly 20 has a panel frame 22 detachably mounted on the front face 1202 of the casing body 12, and an upper member 26 and a lower member 28 that are mounted on the panel frame 22. In the present embodiment, the upper member 26 and the lower member 28 jointly make up a lid movably supported on the panel frame 22 for selectively opening and closing the recording medium insertion slot 14.

The panel frame 22 has a rear frame 32 detachably mounted on the front face 1202 of the casing body 12, and a front frame 24 mounted on a front portion of the rear frame 24.

As shown in FIG. 3, the rear frame 32 has a horizontally elongate rectangular rear wall 3202 which is of substantially the same contour as the front face 1202 of the casing body 12, and four walls 3204 erected forwardly from the respective four sides of a front face 3203 of the rear wall 3202. The rear frame 32 is mounted on the casing body 12 such that the rear wall 3202 has a rear face 3206 superposed on the front face 1202 of the casing body 12.

The rear wall 3202 has a horizontally elongate slot 3208 defined in an upper portion in communication with the recording medium insertion slot 14.

The rear wall 3202 also has two screw insertion holes 3205 defined in respective horizontal end portions at respective vertically intermediate positions.

The rear face 3206 has two horizontally spaced positioning recesses 3214 defined therein at respective vertically intermediate positions in alignment with the respective positioning teeth 1206. The positioning teeth 1206 are selectively engageable in and disengageable from the respective positioning recesses 3214. When the positioning teeth 1206 engage in the respective positioning recesses 3214, the front panel assembly 20 is roughly positioned with respect to the front face 1202 of the casing body 12, allowing the casing body connector 16 to be smoothly coupled to a panel assembly connector 3211, to be described later, and also allowing two engaging fingers 3212, to be described below, to be smoothly coupled to the engaging and disengaging mechanism 18.

The two engaging fingers 3212 are vertically spaced from each other and project from a left side portion of the rear face 3206 in alignment with the engaging and disengaging mechanism 18 for being coupled to the engaging and disengaging mechanism 18.

The rear face 3206 of the rear wall 3202 has a vertically elongate recess 3222 defined therein which is held in alignment with the opening 1210 when the rear face 3206 of the rear wall 3202 is superposed on the front face 1202 of the casing body 12.

A slide member 50 is vertically reciprocally movably disposed on the front face 3203 of the rear wall 3202 in covering relation to the recess 3222.

Figure 12A:
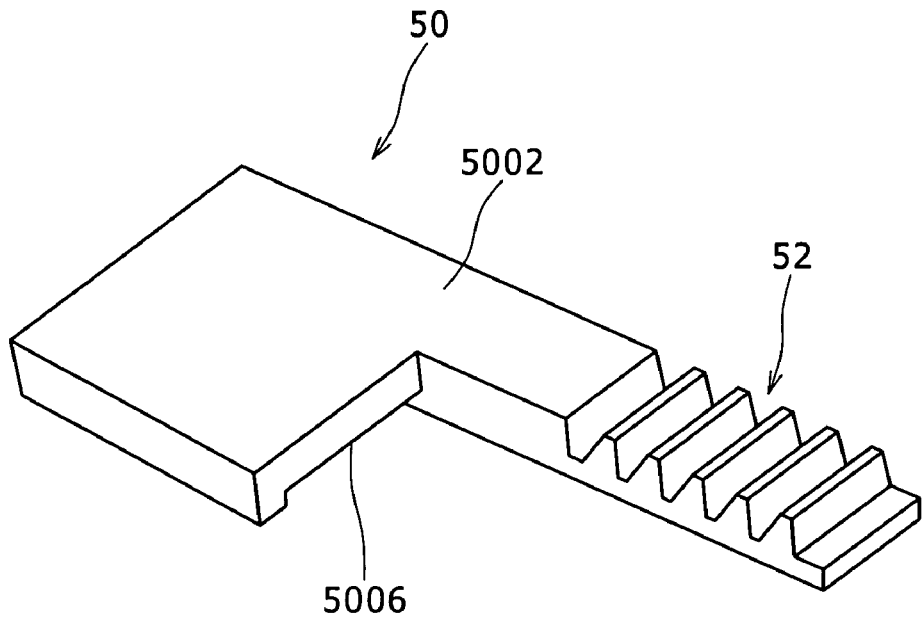
FIGS. 12A and 12B are perspective views of a slide member.
Figure 12B:
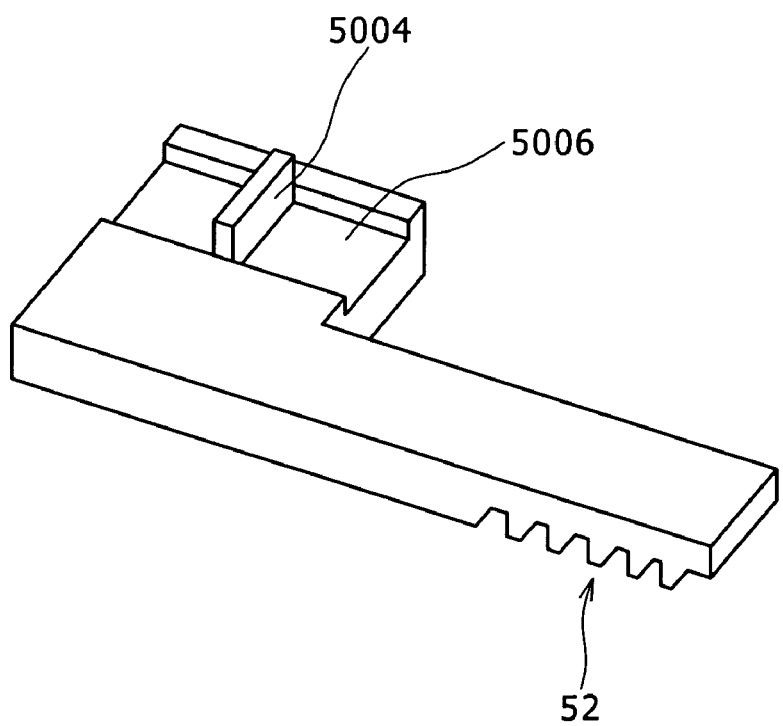
Figure 13A:
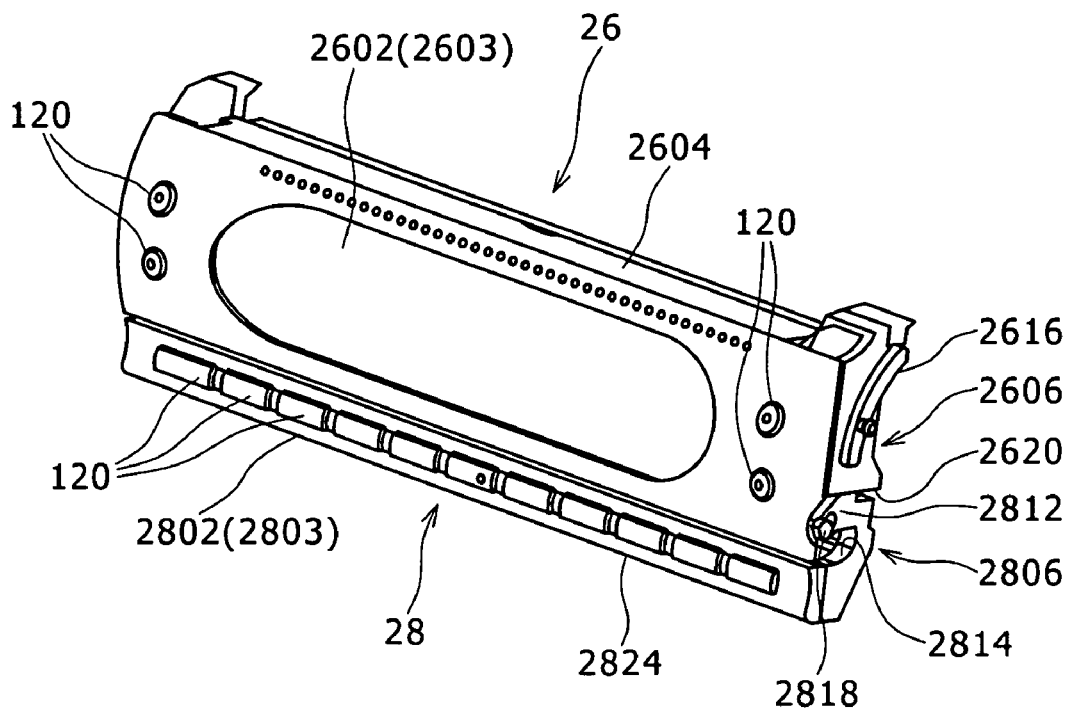
FIGS. 13A and 13B are perspective views of the upper member and the lower member with the recording medium insertion slot being closed.
Figure 13B:
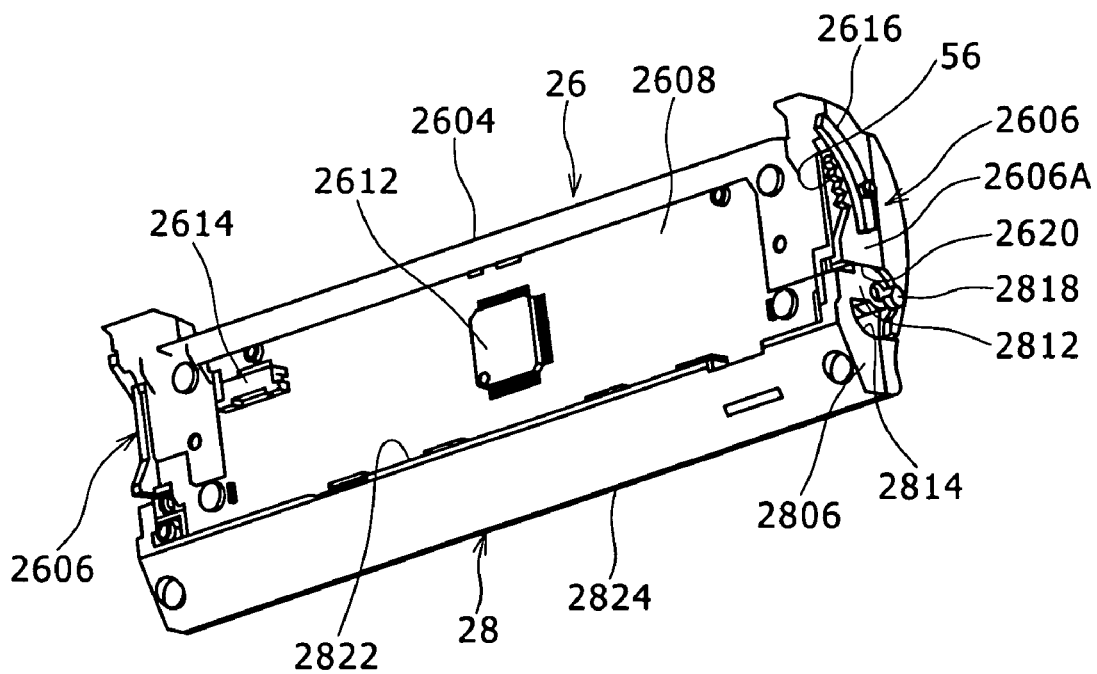
Figure 14A:
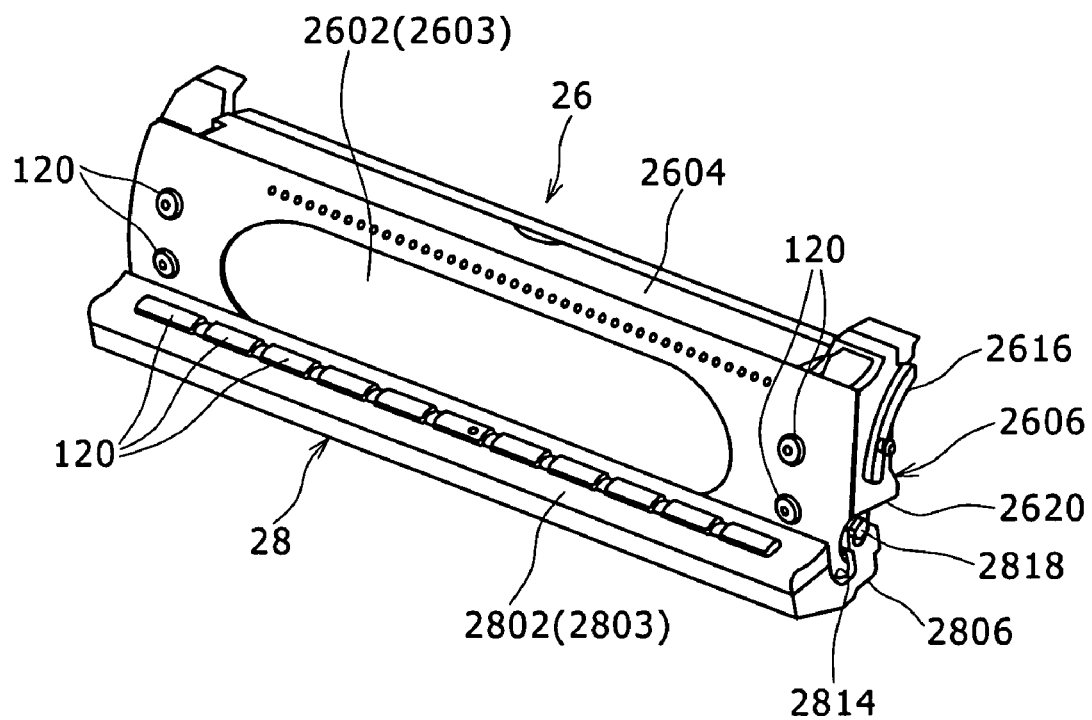
FIGS. 14A and 14B are perspective views of the upper member and the lower member with the recording medium insertion slot being open.
Figure 14B:
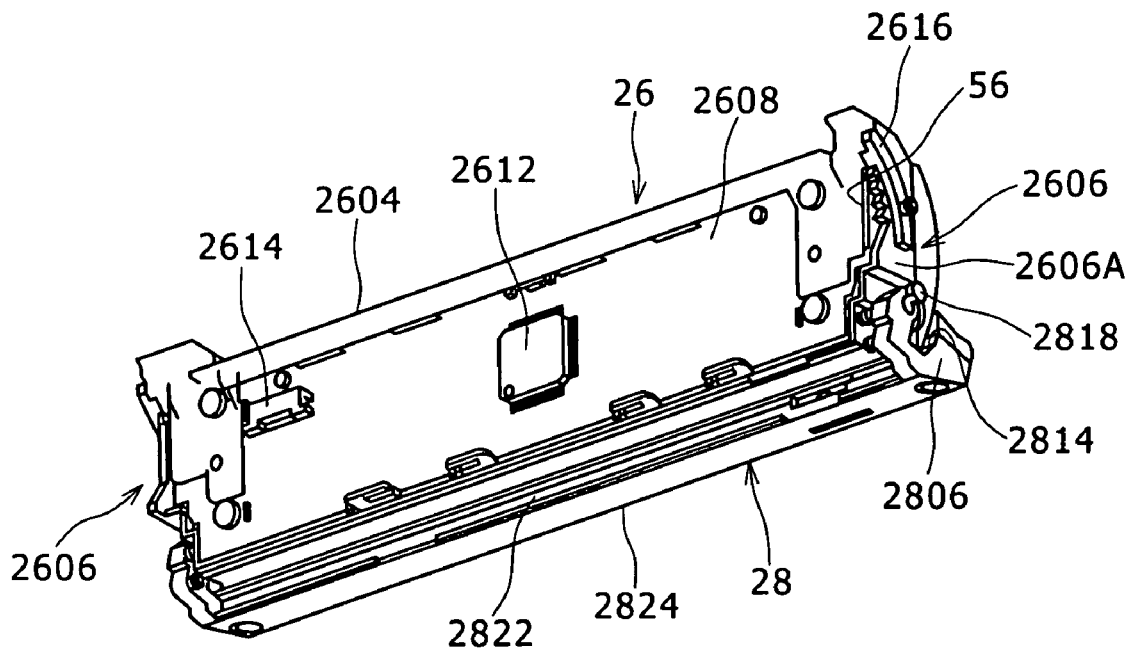

As shown in FIGS. 12A and 12B, the slide member 50 includes a plate-shaped main body 5002, a ridge 5004 projecting from one surface of the main body 5002, and a slide member rack 52 disposed on an opposite surface of the main body 5002 and extending vertically in the width direction of the main body 5002 (along the direction in which the slide member 50 is reciprocally movable).

The ridge 5004 projects from the bottom of a cavity 5006 that is defined in the one surface of the main body 5002.

Figure 3A:
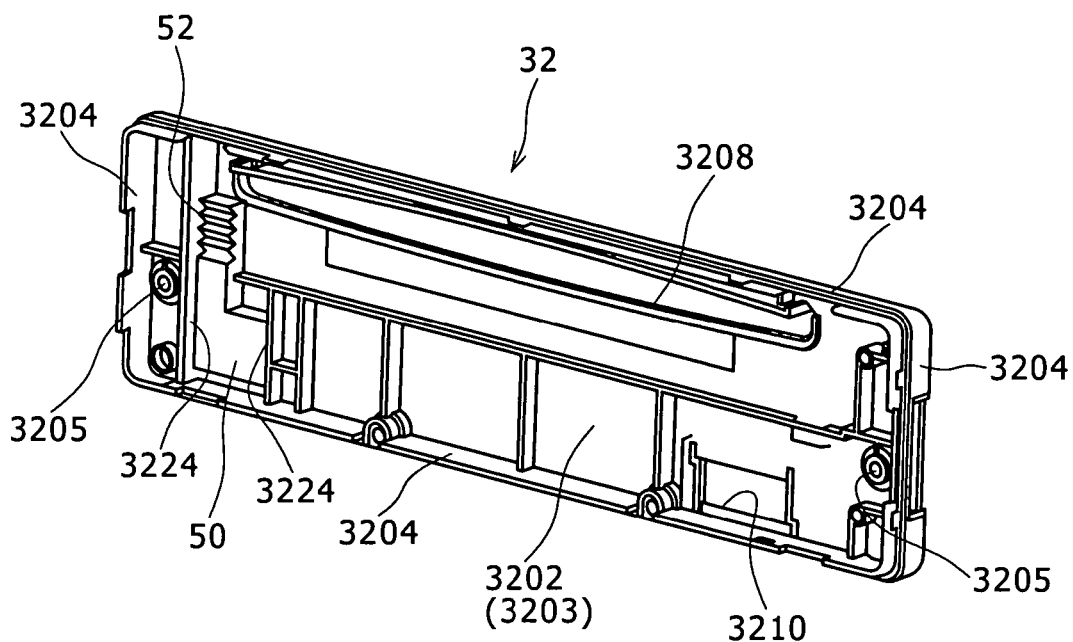
FIG. 3A is a perspective view of a rear frame of a panel frame as viewed obliquely from above in front and FIG. 3B is a perspective view of the rear frame as viewed obliquely from below in rear.
Figure 3B:
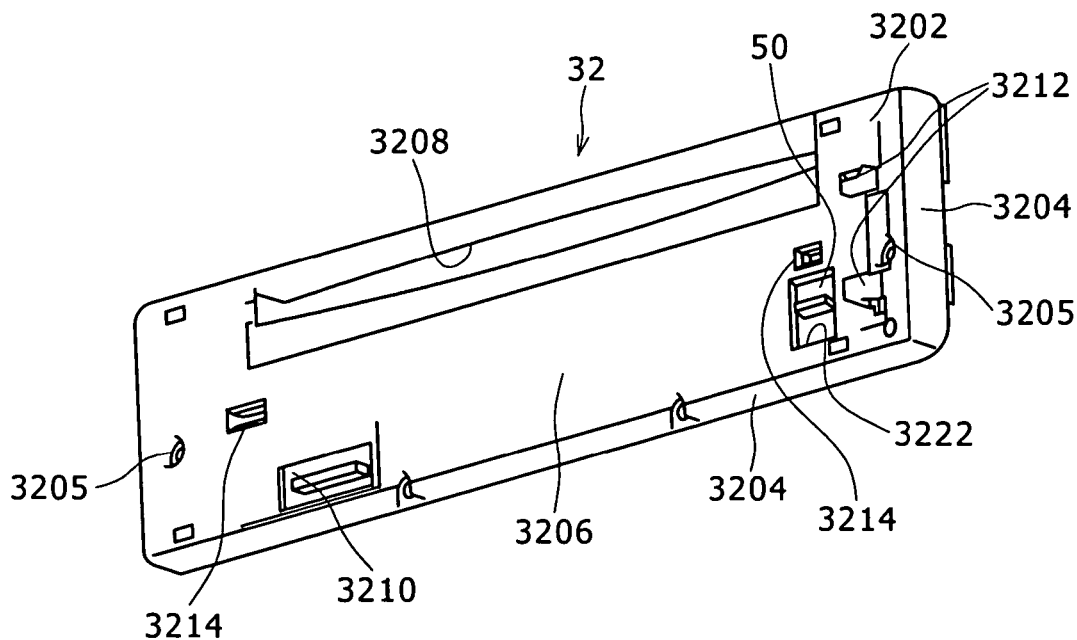

As shown in FIG. 3A, the main body 5002 has opposite side edges supported by respective vertically extending guide walls 3224 erected from the front face 3203 for reciprocal movement vertically (along the directions in which the recess 3222 extends).

Figure 11:
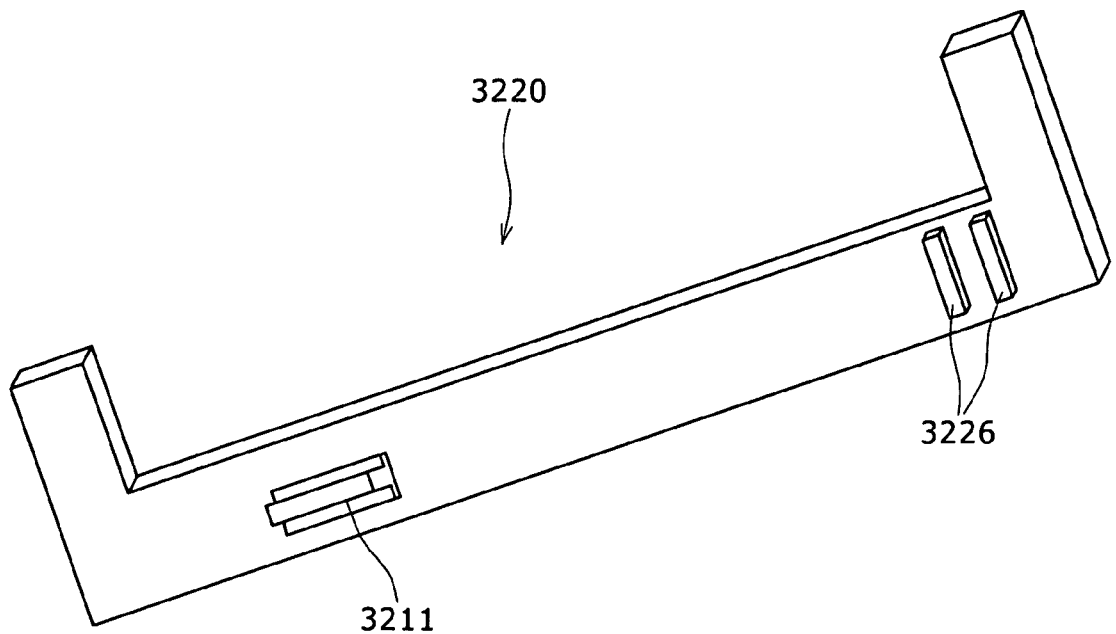
FIG. 11 is a perspective view of a printed-circuit board.

As shown in FIG. 11, a printed-circuit board 3220 is fastened by screws to the front face 3203 of the rear wall 3202 over the slide member 50. The main body 5002 has its opposite surfaces vertically movably supported respectively by the printed-circuit board 3220 and the front face 3203.

The ridge 5004 is accommodated in the recess 3222 for vertical movement therein along the directions in which the recess 3222 extends when the main body 5002 is vertically moved.

The slide member rack 52 is exposed from printed-circuit board 3220 and faces forwardly.

In the present embodiment, as shown in FIG. 11, the printed-circuit board 3220 has two rails 3226 disposed at a position facing the main body 5002 of the slide member 50, the rails 3226 being made of a synthetic material having a small coefficient of friction. The rails 3226 allows the main body 5002 to smoothly move vertically reciprocally.

Figure 10:
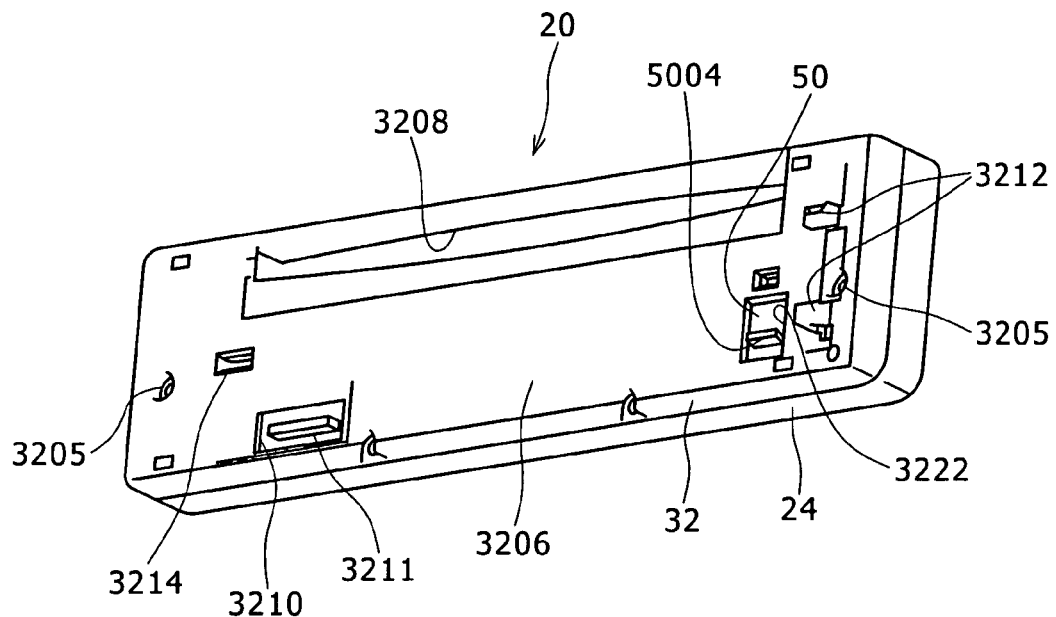
FIG. 10 is a perspective view of the assembled panel frame as viewed obliquely in rear.

The rear wall 3202 has an opening 3210 defined in a lower right portion in alignment with the casing body connector 16 of the casing body 12. A panel assembly connector 3211 is mounted on the printed-circuit board 3220 at a position facing the opening 3210. The panel assembly connector 3211 is capable of selectively engaging and disengaging from the casing body connector 16 (see FIG. 10).

In the present embodiment, a guide member 30 shown in FIGS. 4A and 4B is mounted on the front face 3203 of the rear frame 32.

The guide member 30 includes a strip-shaped joint wall 3002 having a length smaller than the distance between two of the walls 3204 which are positioned respectively on the left and right ends of the rear frame 32, two guide walls 3004 erected respectively from the opposite ends of the joint wall 3002 perpendicularly to the joint wall 3002 and extending parallel to each other, and two prongs 3005 disposed respectively on the guide walls 3004.

Figure 9:
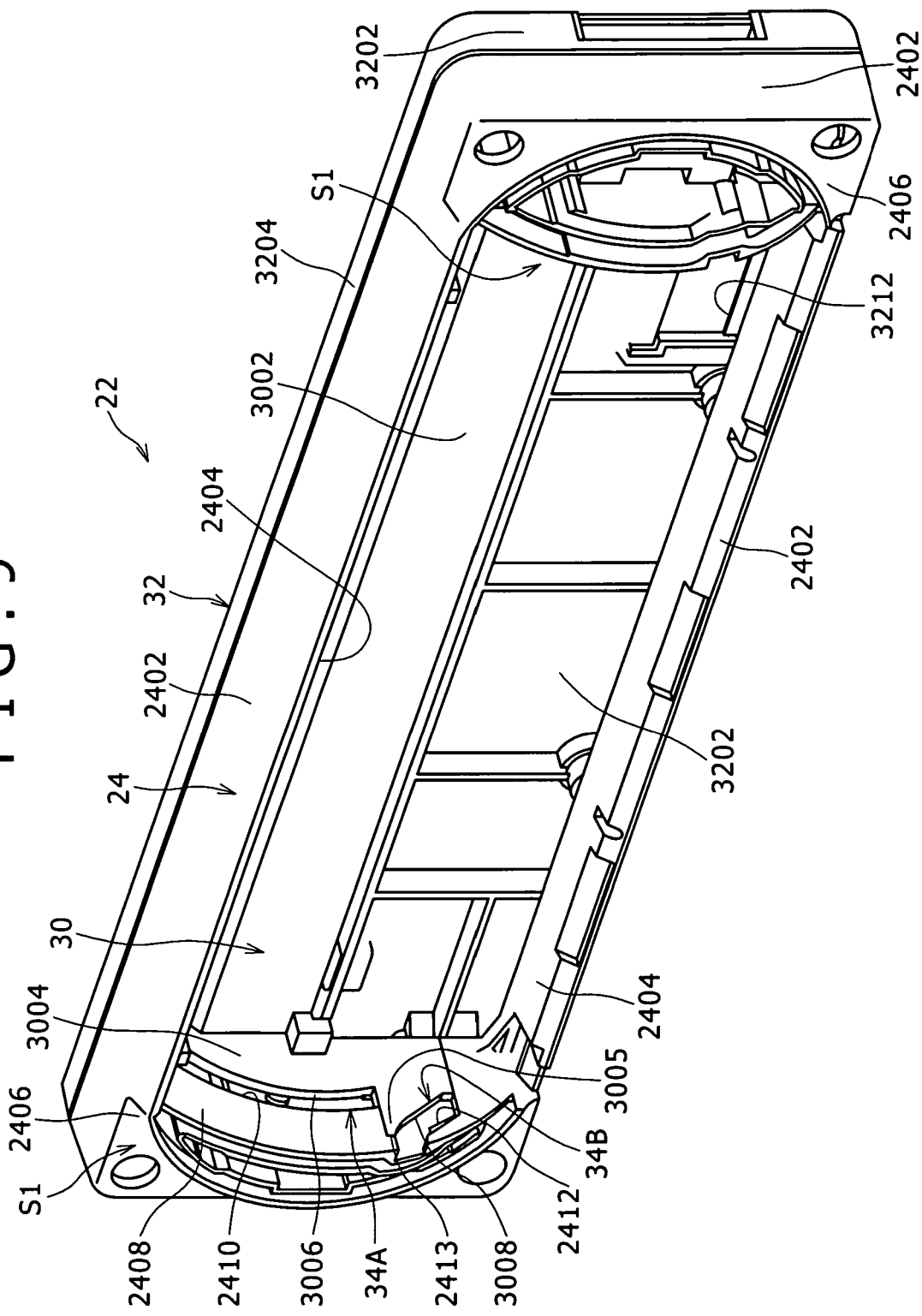
FIG. 9 is a perspective view of the assembled panel frame with bulging walls being omitted from illustration.

As shown in FIGS. 4A, 4B and 9, the guide member 30 is installed on the front fame 3203 of the rear frame 32 by placing the longitudinal axis of the joint wall 3002 parallel to the slot 3208 in the rear frame 32 below the slot 3208, superposing the joint wall 3002 on the front face 3203 of the rear frame 32, and securing the joint wall 3002 to the front face 3203 by thermal fusion or the like.

With the guide member 30 being mounted on the rear frame 32, the guide walls 3004 project forwardly and extend vertically.

Each of the guide walls 3004 has an upper guide surface 3006 and a lower guide surface 3008 on a front end thereof, with the prong 3005 disposed between the upper guide surface 3006 and the lower guide surface 3008.

The upper guide surface 3006 includes an arcuate surface which is forwardly convex as viewed in side elevation and which is inclined progressively forwardly in the downward direction.

The lower guide surface 3008 includes a slanted surface which is inclined progressively rearwardly in the downward direction as viewed in side elevation, and a surface extending from the lower end of the slanted surface parallel to the rear wall 3202.

The prong 3005 projects forwardly from the boundary between the upper guide surface 3006 and the lower guide surface 3008.

Figure 15:
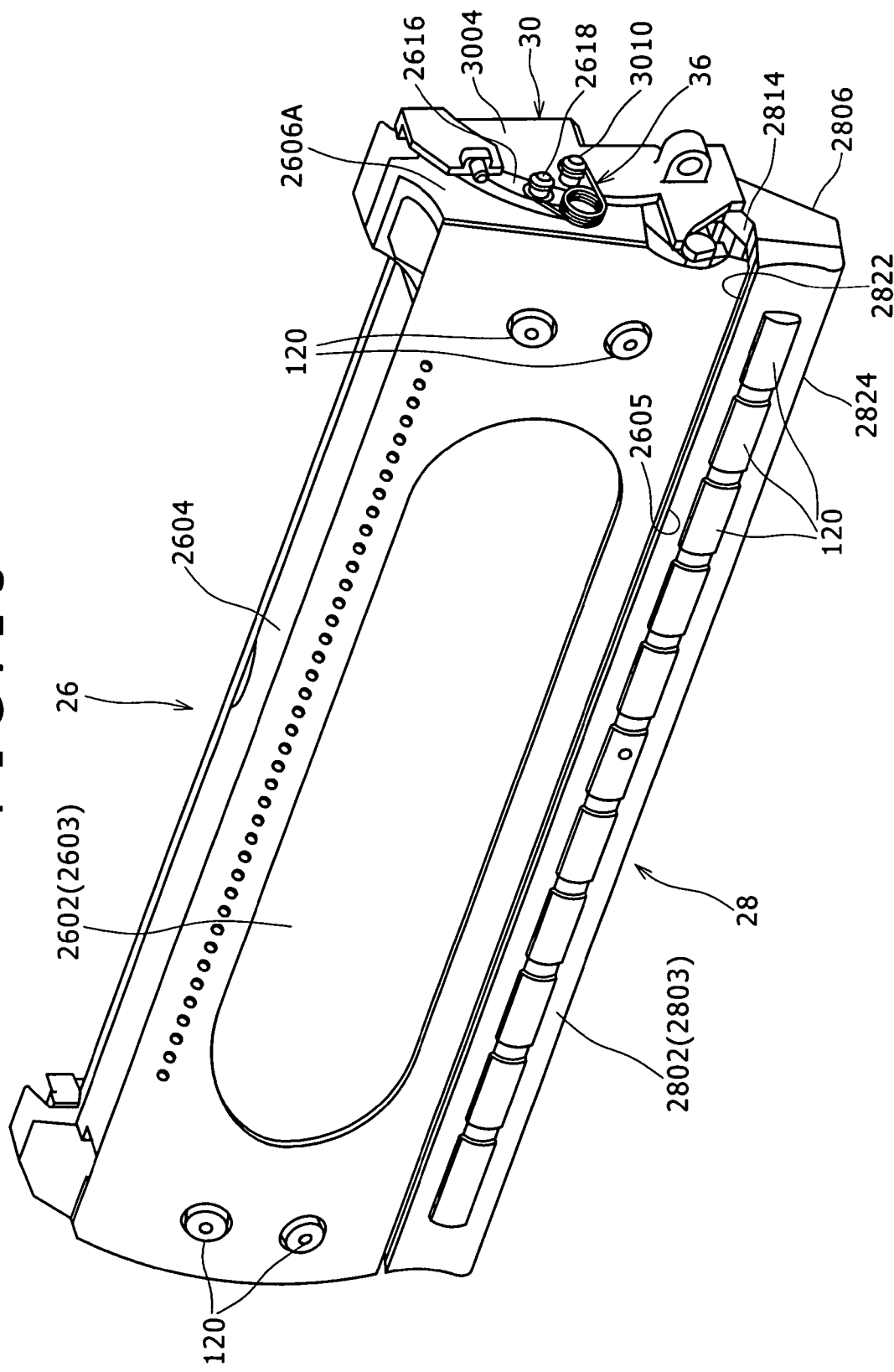
FIG. 15 is a perspective view of the upper member, the lower member, and the guide plate with the recording medium insertion slot being closed.
Figure 16:
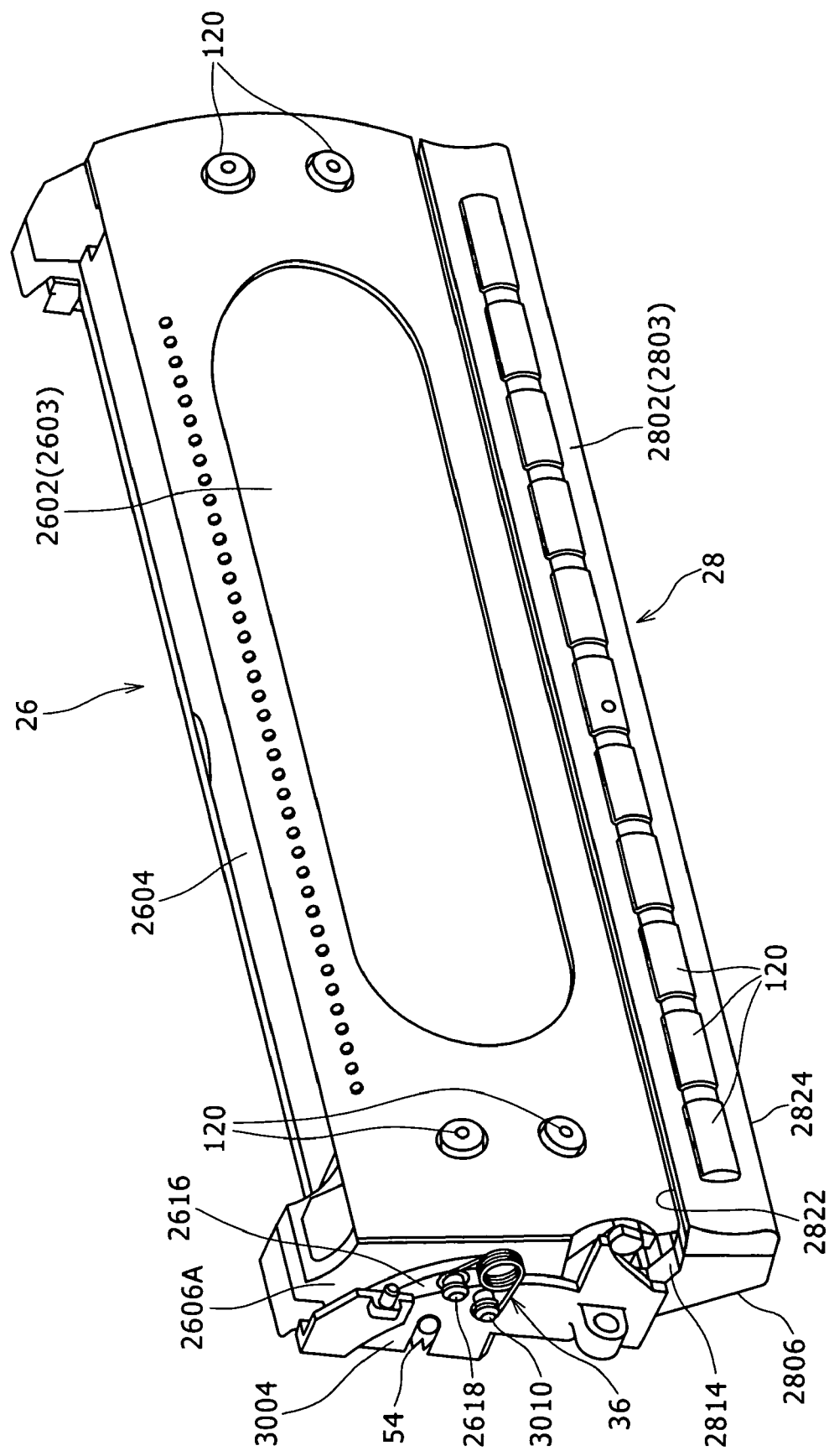
FIG. 16 is a perspective view of the upper member, the lower member, and the guide plate with the recording medium insertion slot being closed.
Figure 17:
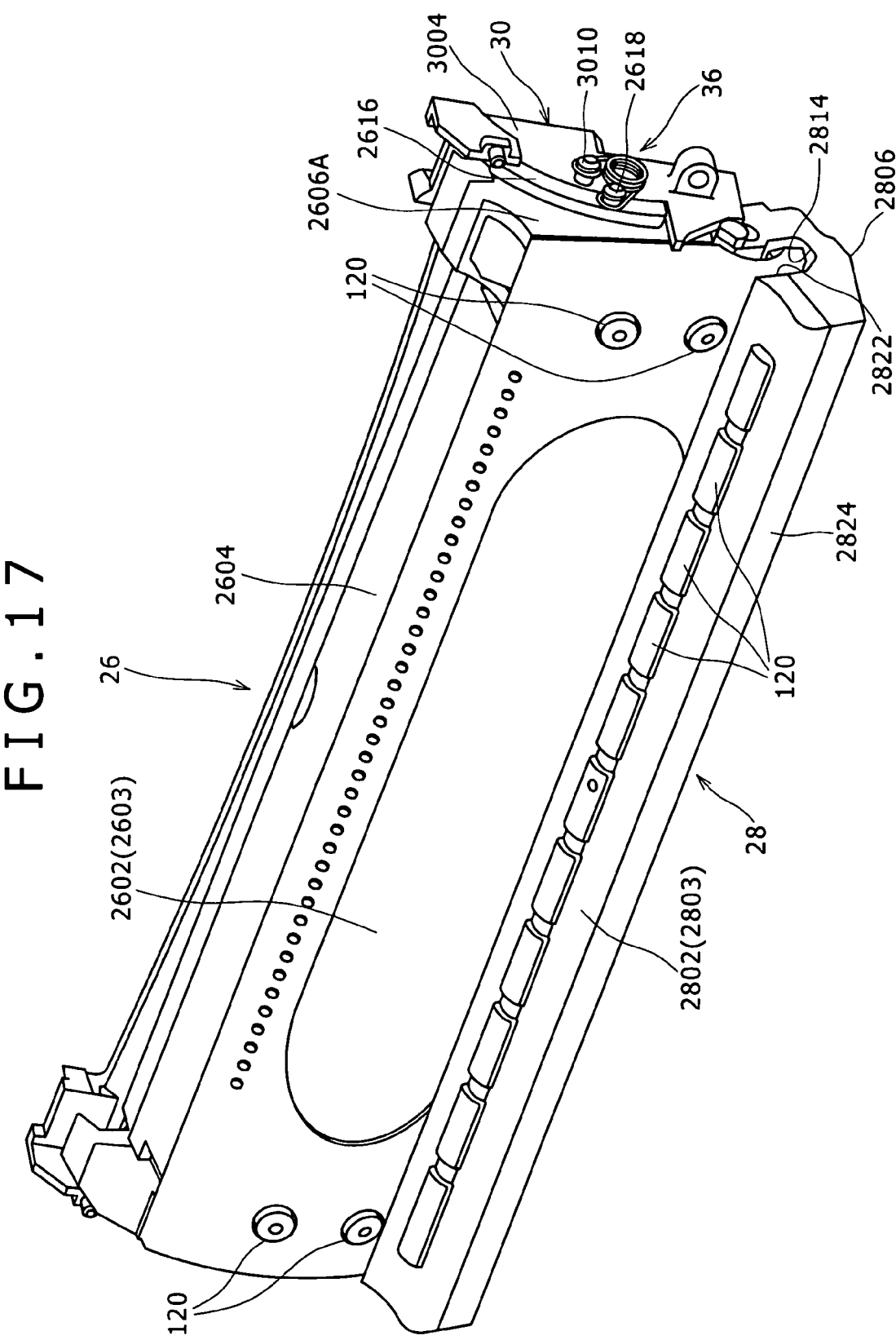
FIG. 17 is a perspective view of the upper member, the lower member, and the guide plate with the recording medium insertion slot being open.
Figure 18:
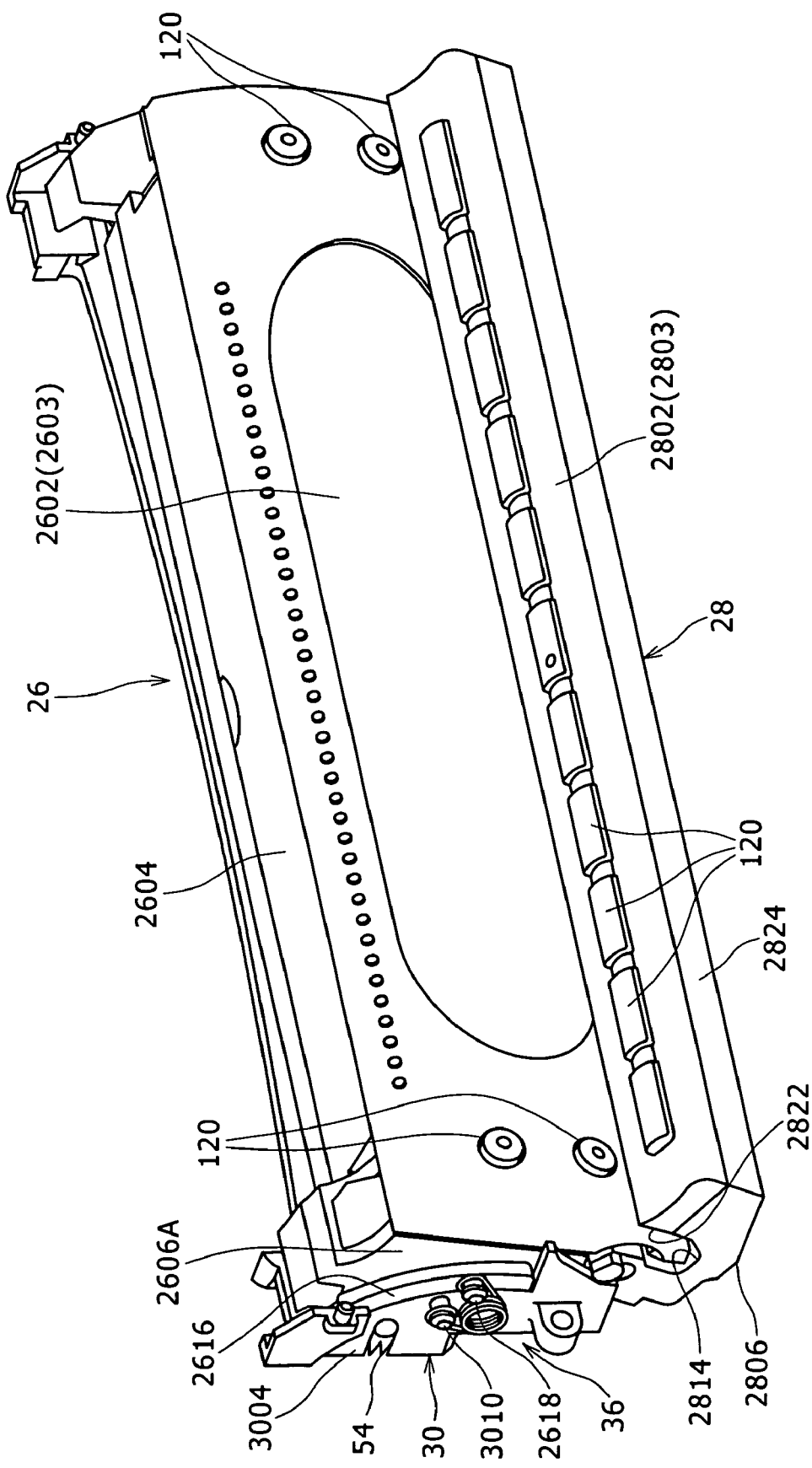
FIG. 18 is a perspective view of the upper member, the lower member, and the guide plate with the recording medium insertion slot being open.

Pins 3010 project respectively from outer surfaces of the guide walls 3004 for engaging respective ends of first toggle springs 36 (FIGS. 15 and 16).

As shown in FIGS. 4A, 4B, 5A, and 5B, a pinion 54 for meshing with the slide member rack 52 is rotatably mounted on a portion of the joint wall 3002 which is near the left one of the guide walls 3004.

The pinion 54 includes a gear 5402 and two shafts 5404 projecting respectively from both end faces of the gear 5402.

Figure 5A:
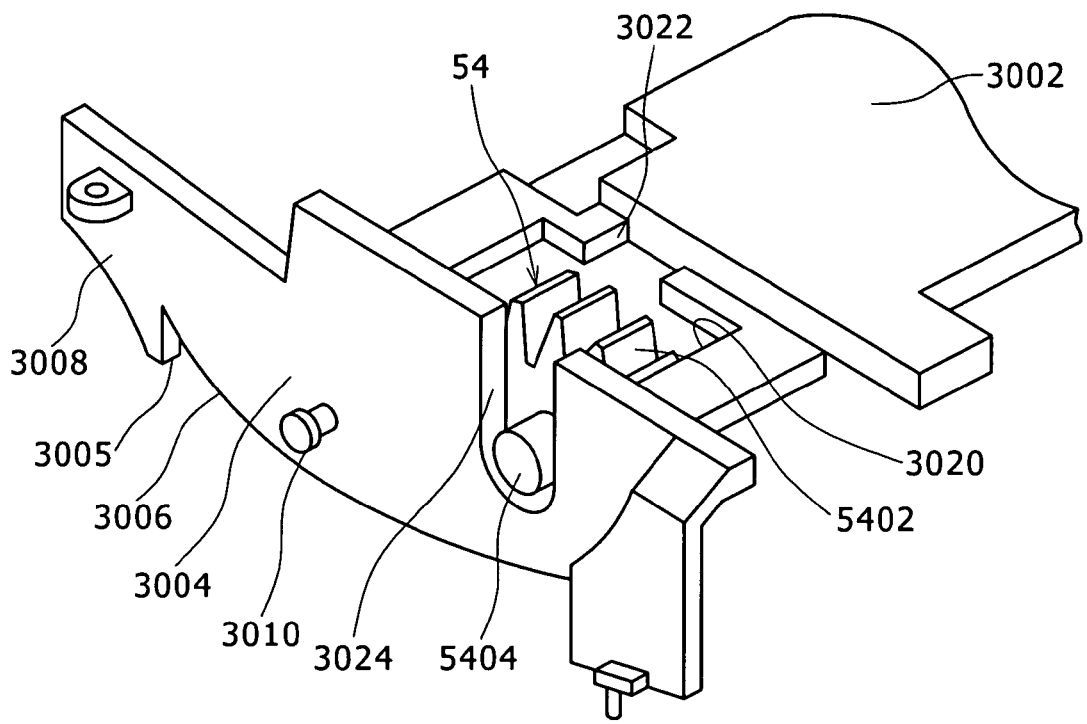
FIGS. 5A and 5B are perspective views of a gear mechanism incorporated in the guide plate.
Figure 5B:
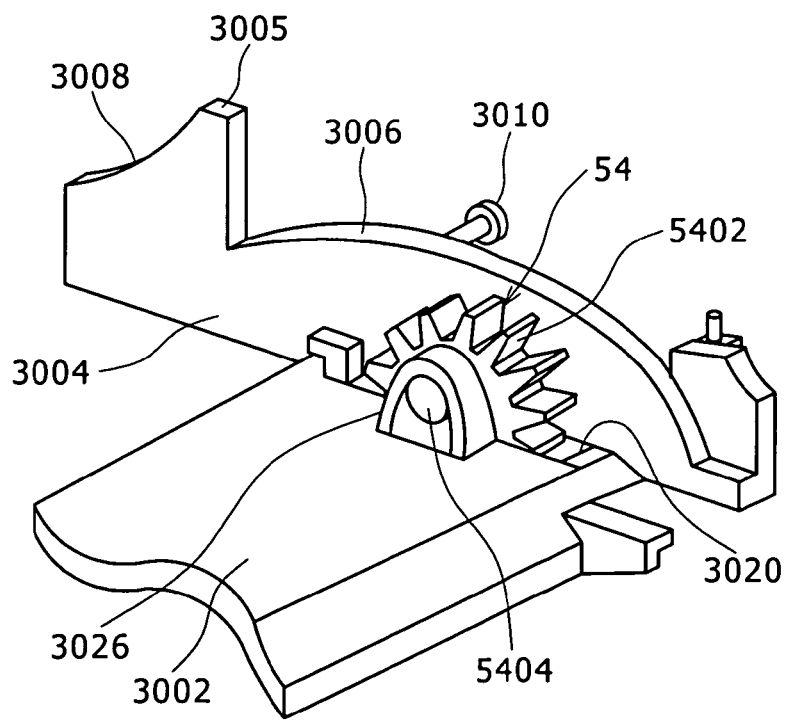

As shown in FIGS. 5A and 5B, the gear 5402 is housed in a first cavity 3020 defined in the joint wall 3002. One of the shafts 5404 is rotatably supported by a bearing 3024 in the form of an oblong groove defined in the guide wall 3004. The other shaft 5404 is rotatably supported by an arcuate bearing wall 3026 mounted on the joint wall 3002. Therefore, the pinion 54 is rotatable about an axis extending horizontally, in other words, in the longitudinal direction of the guide member 30.

Figure 6A:
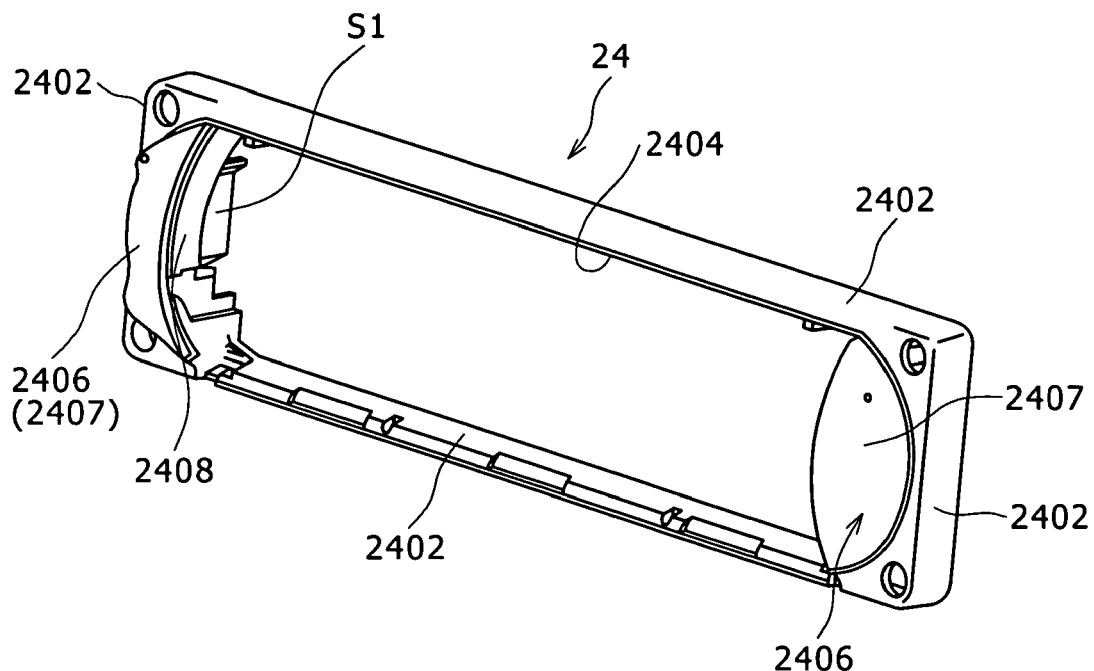
FIG. 6A is a perspective view of a front frame of the panel frame as viewed obliquely from above in front and FIG. 6B is a perspective view of the front frame as viewed obliquely from below in rear.
Figure 6B:
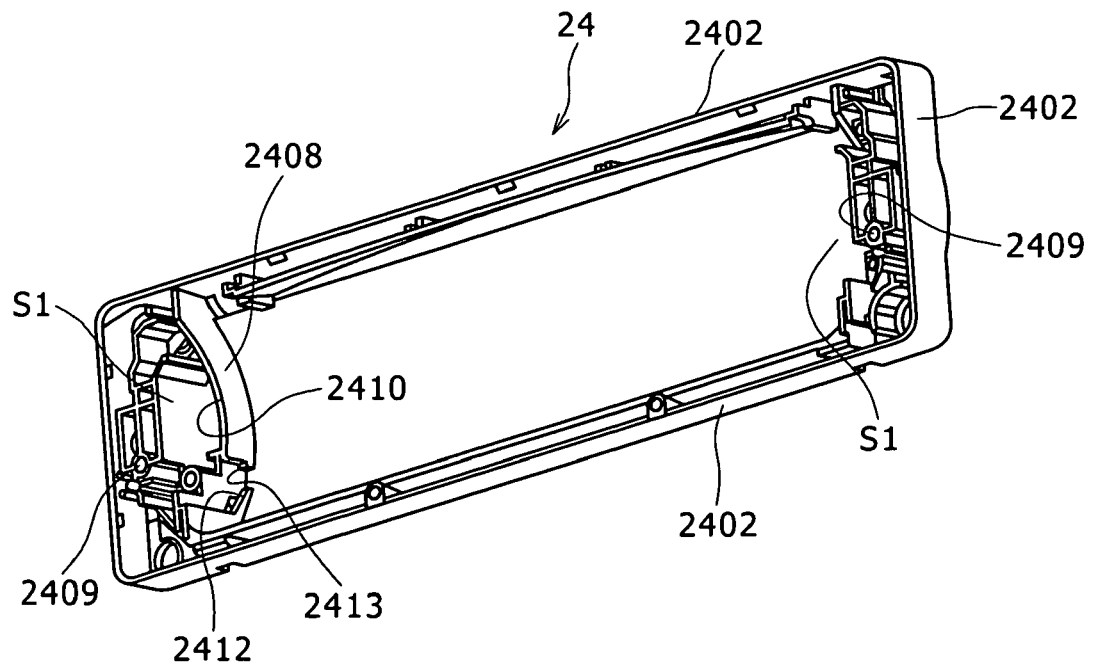

As shown in FIGS. 6A and 6B, the front frame 24 has a horizontally elongate contour matching the rear frame 32, and includes four walls 2402 mating respectively with the four walls 3204 of the rear frame 32.

Two front walls 2406 are disposed on respective left and right sides of the front ends of the four walls 2402. An opening 2404 is defined between the upper and lower walls 2402 and the left and right front walls 2406.

The left and right front walls 2406 include respective bulging walls 2407 near the opening 2404 which are of a partly spherical shape projecting forwardly. Mount seats 2409 project rearwardly from respective back surfaces of the bulging walls 2407.

As shown in FIG. 9, the front frame 24 is mounted on the rear frame 32 by screws threaded through the screw insertion holes 3205 into the mount seats 2409 with the walls 2402 having rear ends abutting against the front ends of the walls 3204 of the rear frame 32. In this manner, the front frame 24 and the rear frame 32 are integrally combined with each other.

Vertically extending guide walls 2408 project rearwardly from the respective edges of the bulging walls 2407 which extend vertically over the opening 2404.

The guide walls 2408 have respective rear ends each including an upper guide surface 2410 and a lower guide surface 2412.

The upper guide surface 2410 includes an arcuate surface which is forwardly convex as viewed in side elevation and which is inclined progressively forwardly in the downward direction.

The lower guide surface 2412 includes a slanted surface which is inclined progressively rearwardly in the downward direction as viewed in side elevation, and a surface extending from the lower end of the slanted surface parallel to the front wall 2406.

The upper guide surface 2410 and the lower guide surface 2412 jointly define therebetween a recess 2413 in which the prong 3005 engages.

With the front frame 24 and the rear frame 32 being assembled together as shown in FIG. 9, the prongs 3005 engage in the respective recesses 2413, and arcuate first guide grooves 34A are defined between the upper guide surfaces 2410 of the front frame 24 and the upper guide surfaces 3006 of the guide member 30.

Bent second guide grooves 34B are also defined between the lower guide surfaces 2412 of the front frame 24 and the lower guide surfaces 3008 of the guide member 30.

With the front frame 24 and the rear frame 32 being assembled together, furthermore, an accommodating space S1 is defined between the left and right front walls 2406 of the front frame 24 and the rear wall 3202 of the rear frame 32. The first guide grooves 34A and the second guide grooves 34B are positioned in the accommodating space S1.

Figure 7A:
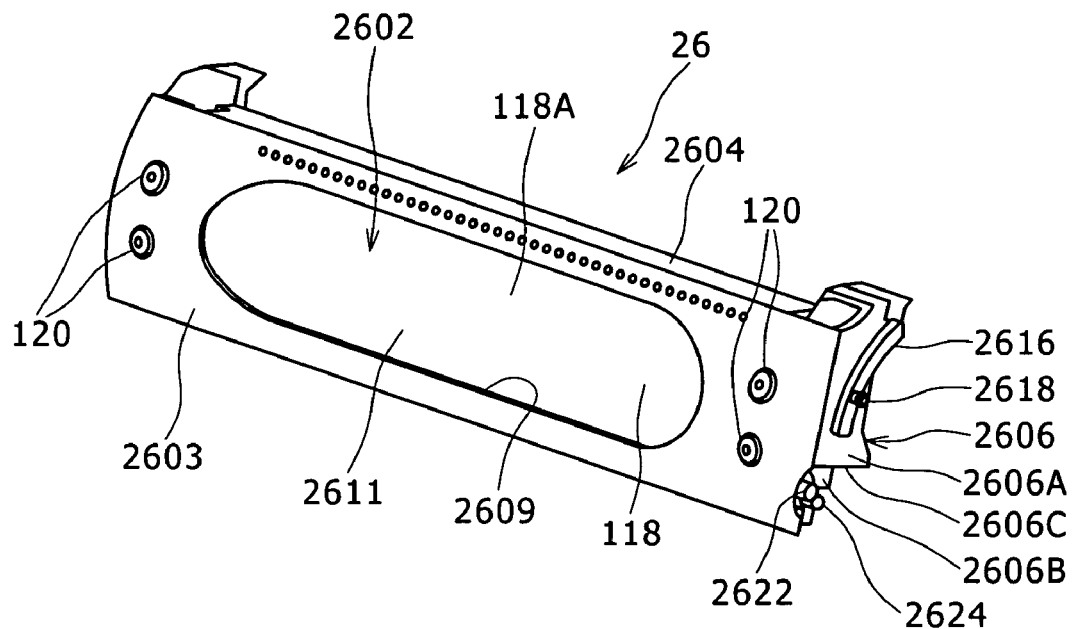
FIG. 7A is a perspective view of an upper member as viewed obliquely from above in front and FIG. 7B is a perspective view of the upper member as viewed obliquely from below in rear.

As shown in FIG. 7A, the upper member 26 has an upper panel 2602 which is horizontally elongate and is of a size movable vertically in the opening 2404 in the front frame 24.

As shown in FIG. 1, the upper panel 2602 is of a horizontally elongate rectangular shape having a horizontal width smaller than a vertical height thereof. The upper panel 2602 has a front face 2603 which faces forwardly when the upper member 26 is positioned in the opening 2404. The front face 2603 includes a forwardly convex partly cylindrical surface extending along the edges of the bulging walls 2407.

Two vertically spaced control switches 120 are mounted on the front face 2603 near each of the left and right sides thereof.

Figure 7B:
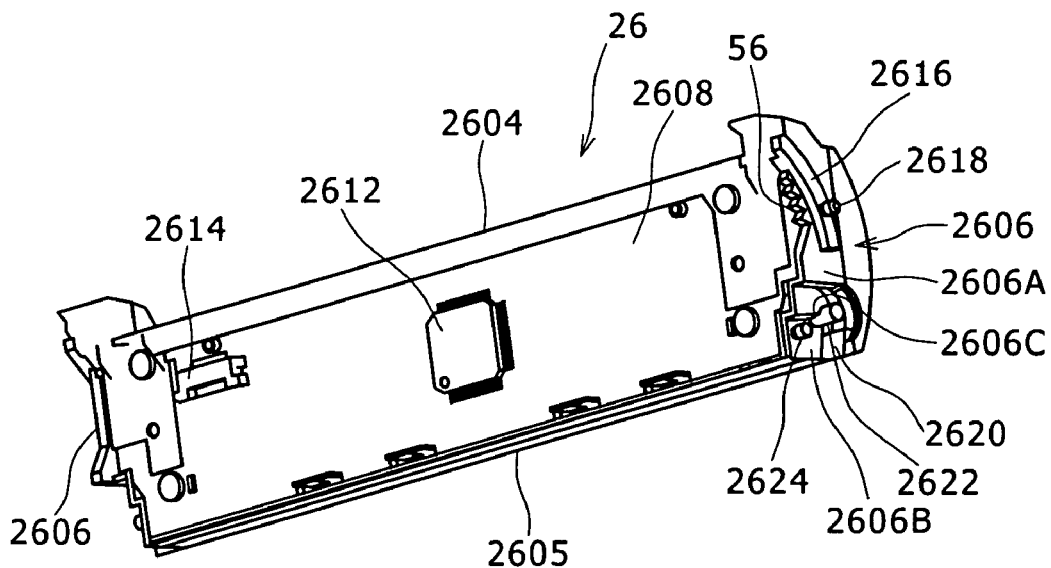

As shown in FIG. 7B, a printed-circuit board 2608 is mounted on a rear side of the upper panel 2602. A display panel 118 (see FIG. 38) is mounted on the front surface of the printed-circuit board 2608. The display panel 118 has a display surface 118A disposed in a horizontally elongate opening 2609 defined in the upper panel 2602. A transparent plate 2611 made of synthetic resin or the like is mounted substantially entirely on the front face 2603 including the opening 2609. Stated otherwise, the display surface 118A of the display panel 118 is disposed on the front face 2603 of the upper panel 2602.

On the rear surface of the printed-circuit board 2608, there are mounted an electronic component 2612 including an LSI serving as an electric circuit for generating control signals when the control switches 120 are pressed and a connector 2614 connected to a flexible board (not shown) that is connected to the printed-circuit board 3220 in accordance with driving the display 118. Drive signals from a control circuit 116 (see FIG. 38) are supplied through the printed-circuit board 3220, the flexible board referred to above, the connector 2614, and the electric circuit referred to above to the display panel 118. Control signals generated when the control switches 120 are pressed are supplied through the electric circuit, the connector 2614, the flexible board, the printed-circuit board 3220, the panel assembly connector 3211, and the casing body connector 16 to the control circuit 116.

An upper wall 2604 projects rearwardly from the upper edge of the upper panel 2602. A lower wall 2605 projects rearwardly from the lower edge of the upper panel 2602. Side walls 2606 project rearwardly from the respective left and right sides of the upper panel 2602.

The left and right side walls 2606 have respective upper side walls 2606A projecting rearwardly from the left and rear ends of the upper panel 2602 except their lower portions, respective lower side walls 2606B projecting rearwardly from the lower portions of the left and rear ends of the upper panel 2602 at positions inwardly displaced along the width of the upper panel 2602, and respective joint walls 2606C interconnecting the upper side walls 2606A and the lower side walls 2606B. On the rear face of the upper panel 2602, there are defined recesses 2620 that are concave inwardly along the width of the upper panel 2602 in the lower portions of the left and rear ends thereof by the lower side walls 2606B and the joint walls 2606C.

Vertically extending arcuate ridges 2616 which are convex forwardly project laterally from the respective rear ends of the left and right upper side walls 2606A. Pins 2618 for engaging the other ends of the first toggle springs 36 (FIGS. 15 and 16) project laterally from the ridges 2616 near their lower ends.

As shown in FIG. 7B, the left upper side wall 2606A has a lid rack 56 for meshing with the pinion 54. The lid rack 56 is disposed inwardly and rearwardly of the left ridge 2616 and extends along the arcuate shape of the ridge 2616 in the vertical directions (along which the upper member 26 and the lower member 28 are movable in directions to open and close the recording medium insertion slot 14).

Pivot shafts 2622 for coupling the lower member 28 to the upper member 26 project laterally from the respective left and right lower side walls 2606B.

Pins 2624 for engaging respective ends of second toggle springs 38 (FIG. 19) project laterally from the respective left and right lower side walls 2606B near their lower ends.

The upper member 26 is assembled into the front frame 24 and the rear frame 32 by bringing itself into widthwise alignment with the opening 2404 in the front frame 24 and inserting the ridges 2616 into the respective first guide grooves 34A. The assembled upper member 26 is vertically movable in the opening 2404 while the ridges 2616 are being vertically guided in and along the respective first guide grooves 34A.

More specifically, the upper member 26 is vertically movable between an upper position in which the upper panel 2602 closes the recording medium insertion slot 14 and a lower position in which the upper panel 2602 opens the recording medium insertion slot 14.

When the upper member 26 is positioned in the upper position, the upper edge (the upper wall 2604) of the upper panel 2602 is disposed closely to the upper wall 2402 of the front frame 24.

As shown in FIGS. 15 through 18, when the upper member 26 is positioned near the upper position, the first toggle springs 36 urge the upper member 26 to move into the upper position, and when the upper member 26 is positioned near the lower position, the first toggle springs 36 urge the upper member 26 to move into the lower position. The first toggle springs 36 and the pins 2618, 3010 jointly make up a first toggle mechanism. The ridges 2616 and the first guide grooves 34A jointly make up a support mechanism for supporting the upper member 26.

Figure 8A:
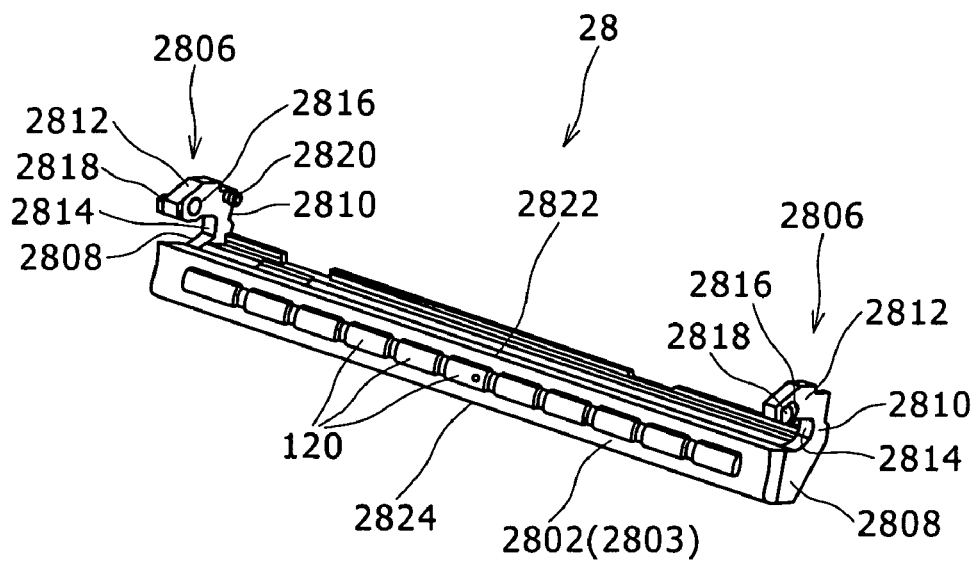
FIG. 8A is a perspective view of a lower member as viewed obliquely from above in front and FIG. 8B is a perspective view of the lower member as viewed obliquely from below in rear.
Figure 8B:
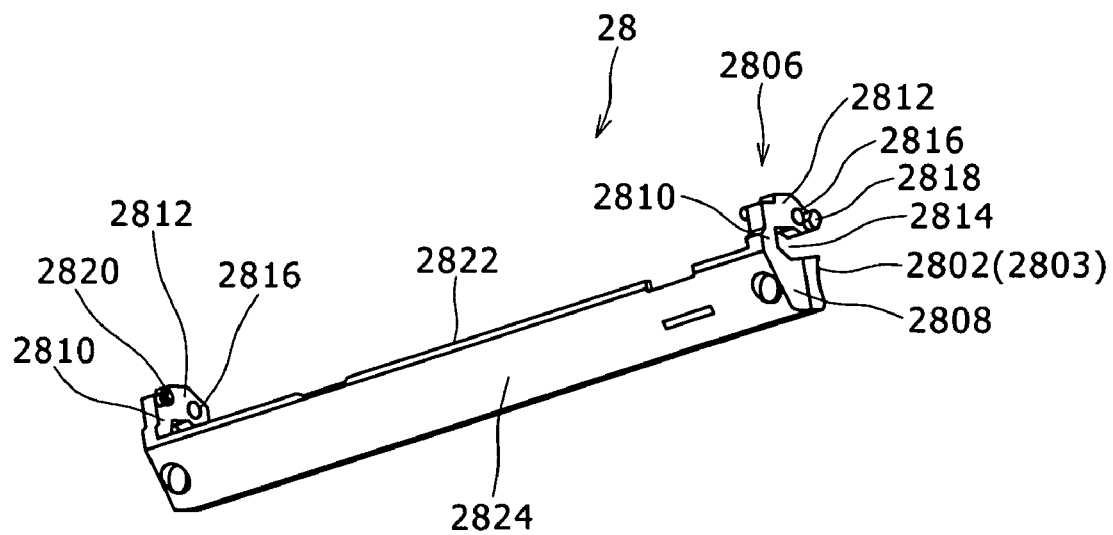

As shown in FIGS. 8A and 8B, the lower member 28 is coupled to the upper member 26 for swinging movement about the pivot shafts 2622 (see FIGS. 7A and 7B) of the upper member 26. The lower member 28 has a lower panel 2802 which is of a height smaller than the height of the upper panel 2602, is horizontally elongate between its left and right ends, and is of a size which can be placed in the opening 2404 in the front frame 24 below the upper panel 2602.

The lower panel 2802 is of a horizontally elongate rectangular shape having a horizontal width smaller than a vertical height thereof. The vertical height of the lower panel 2802 is smaller than the vertical height of the upper panel 2602.

As shown in FIG. 1, the lower panel 2802 has a front face 2803 which faces forwardly with the lower member 28 being placed in the opening 2404. The front face 2803 includes a curved surface which is concave rearwardly.

A plurality of control switches 120 (control keys) for controlling the vehicle-mounted electronic device 100 are mounted as a horizontal array on the front face 2803. Since the front face 2803 is concave rearwardly, the control switches 120 can easily be operated.

The plurality of control switches 120 are electrically connected to the control circuit 116 on the upper member 26 by a wiring member, not shown (for example, a flexible board). As with control signals generated by the control switches 120 on the upper member 26, control signals generated by the control switches 120 are transmitted through the wiring member, the electric circuit referred to above, the connector 2614, the flexible board referred to above, the printed-circuit board 3220, the panel assembly connector 3211, and the casing body connector 16 to the control circuit 116.

Arms 2806 project rearwardly from the respective left and right sides of a rear face 2804 of the lower panel 2802.

Each of the arms 2806 includes a first arm member 2808 joined to the rear face 2804 and extending rearwardly therefrom, a second arm member 2810 extending upwardly from the rear end of the first arm member 2808, and a third arm member 2812 extending forwardly from the upper end of the second arm member 2810. The first arm member 2808 and the third arm member 2812 jointly define therebetween a panel accommodating groove 2814 which is open forwardly.

The third arm members 2812 have respective bearing holes 2816 defined in front portions thereof for receiving the respective pivot shafts 2622 of the upper member 26 for swinging movement.

Knobs 2818 project laterally outwardly from the transversely outer surfaces of the front portions of the respective third arm members 2812. Pins 2820 for engaging the other ends of the respective second toggle springs 38 (see FIG. 19) project transversely inwardly from the transversely inner surfaces of the front portions of the respective third arm members 2812.

The lower panel 2802 has an upper face 2822 extending rearwardly from the upper edge of the front face 2803 and interconnecting the upper edges of the left and right first arm members 2808. The lower panel 2802 also has a lower face 2824 extending rearwardly from the lower edge of the front face 2803 and interconnecting the lower edges of the left and right first arm members 2808.

As shown in FIGS. 13A, 13B, 14A, and 14B, the upper member 26 and the lower member 28 are coupled to each other by placing the left and right third arm members 2812 into the respective recesses 2620 and putting the pivot shafts 2622 rotatably into the bearing holes 2816. Stated otherwise, the front portions of the third arm members 2812 are coupled to the upper member 26 for swinging movement about a horizontal axis extending through the upper member 26 behind the lower portion of the upper panel 2602. With the upper member 26 and the lower member 28 being thus coupled to each other, the outer surfaces of the left and right upper side walls 2606A of the upper member 26, and the left and right side surfaces of the lower panel 2802 of the lower member 28 and the side surfaces of the arms 2806 lie substantially flush with each other.

When the ridge 5004 is moved vertically, or in other words, (along the directions in which the recess 3222 extends), in the recess 3222, the pinion 54 is rotated by the slide member rack 52, causing the lid rack 56 to move the upper member 26 vertically. The lower member 28 is now angularly moved forwardly or rearwardly about the pivot shafts 2622 while the knobs 2818 are being guided forwardly or rearwardly in and along the second guide grooves 34B upon the vertical movement of the upper member 26.

More specifically, as shown in FIGS. 1A, 13A, 13B, 15, and 16, when the ridge 5004 is positioned at a position which is spaced upwardly from, but closely to, the lower end of the recess 3222, the upper panel 2602 of the upper member 26 is positioned in the upper position referred to above. At this time, the upper end of the front face 2803 of the lower panel 2802 extends continuously from the lower end of the front face 2603 of the upper panel 2602, and the front faces 2803, 2603 are in an erected position in which they extend horizontally and close the opening 2404.

As shown in FIGS. 1B, 14A, 14B, 17, and 18, when the ridge 5004 is positioned at a position which is spaced downwardly from, but closely to, the upper end of the recess 3222, the upper panel 2602 of the upper member 26 is positioned in the lower position referred to above. At this time, the lower ends of the left and right ends of the upper panel 2602 are accommodated in the panel accommodating groove 2814 of the lower member 28, the upper end of the lower panel 2802 is positioned forwardly of the lower portion of the upper panel 2602, and the front face 2803 of the lower panel 2802 is in an inclined position in which it faces obliquely upwardly. In the present embodiment, in the inclined position, the lower panel 2802 has its upper end positioned downwardly and forwardly of the display surface 118A of the display panel 118 on the front face 2603 of the upper panel 2602.

When the lower member 28 is positioned closely to the erected position, the second toggle springs 38 urge the lower panel 2802 to move into the erected position, and when the lower member 28 is positioned closely to the inclined position, the second toggle springs 38 urge the lower panel 2802 to move into the inclined position.

The slide member rack 52, the pinion 54, and the lid rack 56 jointly make up an interlink mechanism for moving the upper member 26 (the upper member 26 and the lower member 28, or in other words, the lid) in the directions to open and close the recording medium insertion slot 14 when the slide member 50 is reciprocally moved.

In the present embodiment, the second toggle springs 38 and the pins 2624, 2820 jointly make up a second toggle mechanism. The knobs 2818 of the lower member 28 and the second guide grooves 34B jointly make up an interlink mechanism for moving the lower member 28 in response to vertical movement of the upper member 26.

In both the upper position and the lower position, the upper member 26 is kept within the contour of the front face 1202 of the casing body 12 as viewed from the front side of the casing 10. In both the erected position and the inclined position, the lower member 28 is kept within the contour of the front face 1202 of the casing body 12 as viewed from the front side of the casing 10.

The casing body 12 will be described in detail below with reference to FIGS. 32 through 37A to 37D.

An engaging member for engaging the slide member 50 while the front panel assembly 20 is coupled to the casing body 12 is disposed in the front face 1202 of the casing body 12. The casing body 12 houses an actuating mechanism 60 for reciprocally moving the engaging member in the casing body 12 in directions to reciprocally move the slide member 50.

As shown in FIG. 32, the engaging member is constructed of the first arm 62 and the second arm 64 which are spaced from each other in the directions to reciprocally move the slide member 50. The first arm 62 and the second arm 64 are swingably supported on a mount frame 6002. The first arm 62 and the second arm 64 have respective distal ends 6204, 6404 exposed on the front face 1202 of the casing body 12.

The actuating mechanism 60 includes a cam plate 66, a motor 68, and a gear train 70. The actuating mechanism 60 is disposed on the mount frame 6002 which is mounted in the casing body 12.

Rotational drive power generated by the motor 68 is transmitted through the gear train 70 to the cam plate 66, which is rotated about a pivot shaft 6601.

Figure 33:
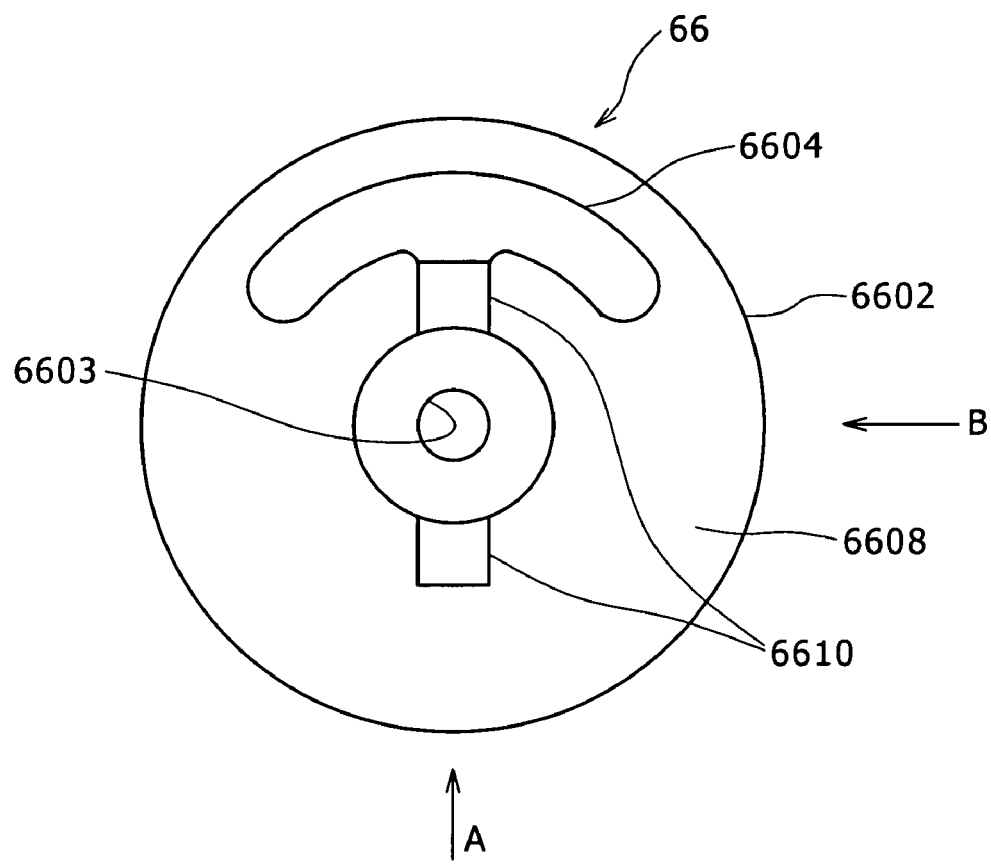
FIG. 33 is a plan view of a cam plate.
Figure 34:
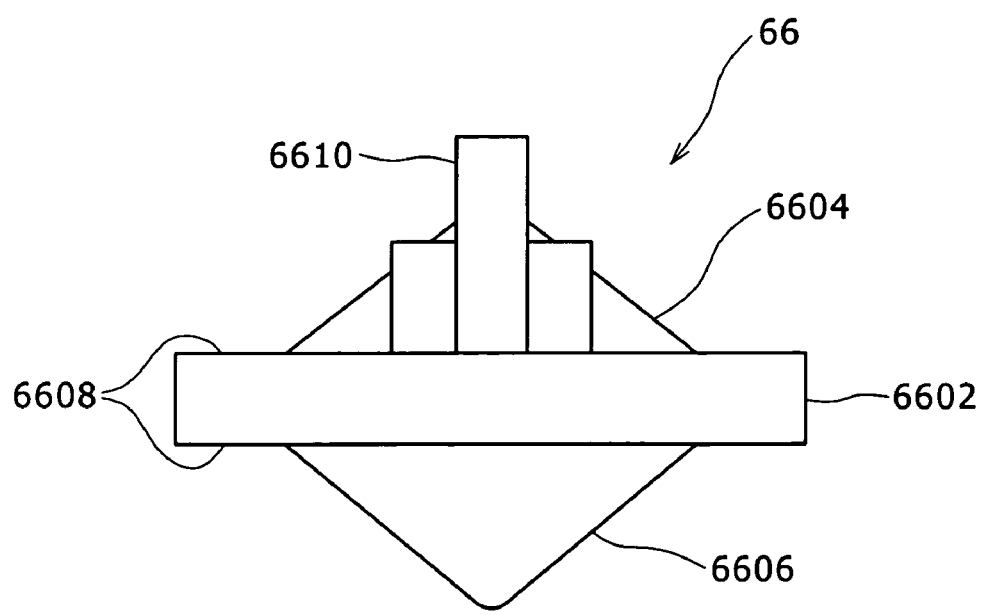
FIG. 34 is a view of the cam plate as viewed in the direction indicated by the arrow A in FIG. 33.
Figure 35:
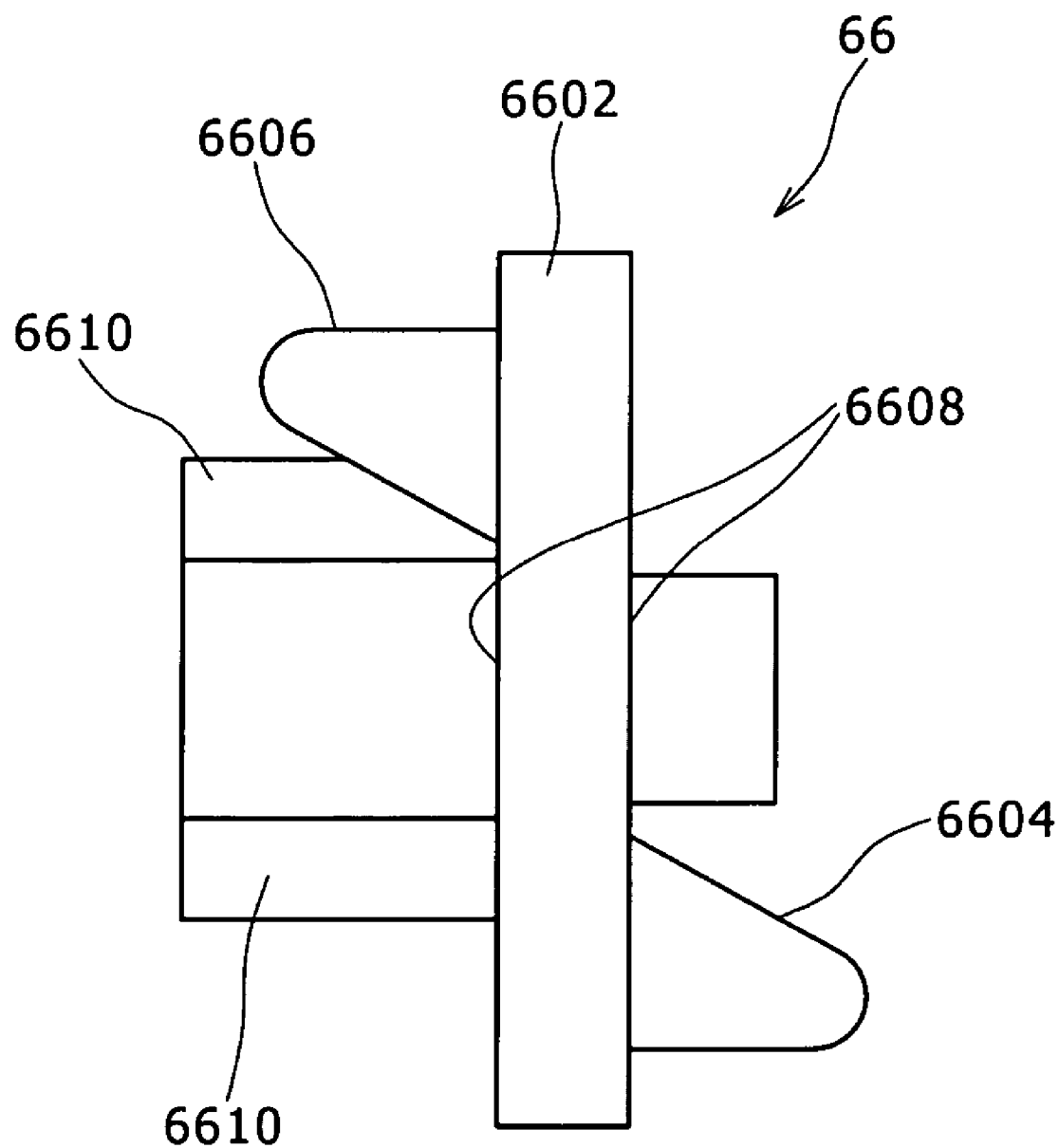
FIG. 35 is a view of the cam plate as viewed in the direction indicated by the arrow B in FIG. 34.
Figure 36A:
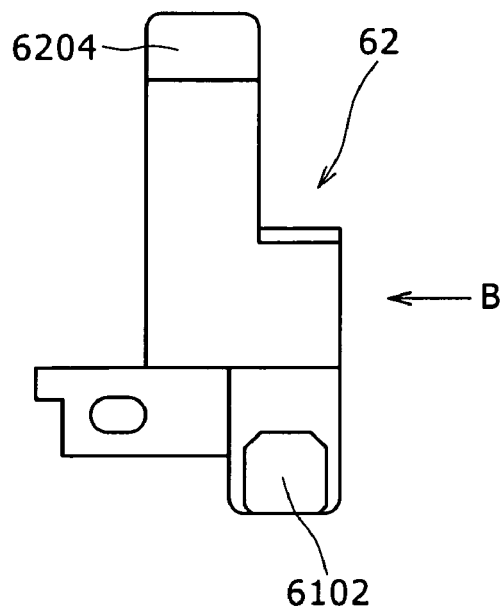
FIG. 36A is a front elevational view of a first arm member.
Figure 36B:
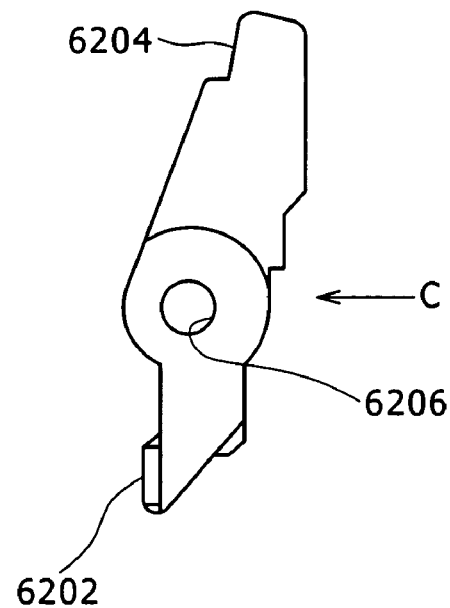
FIG. 36B is a view of the first arm member as viewed in the direction indicated by the arrow B in FIG. 36A.
Figure 36C:
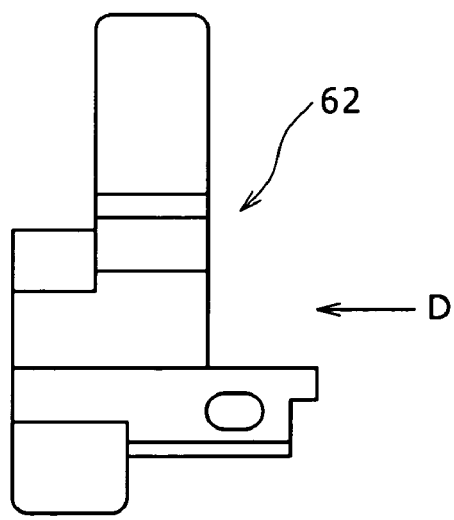
FIG. 36C is a view of the first arm member as viewed in the direction indicated by the arrow C in FIG. 36B.
Figure 36D:
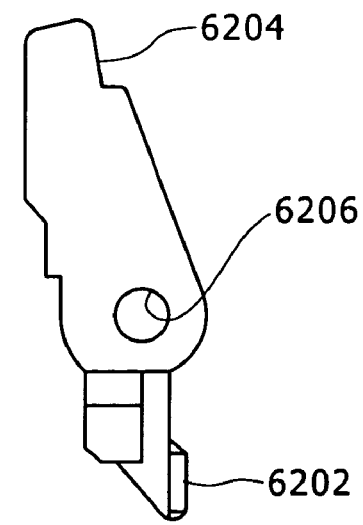
FIG. 36D is a view of the first arm member as viewed in the direction indicated by the arrow D in FIG. 36C.
Figure 37A:
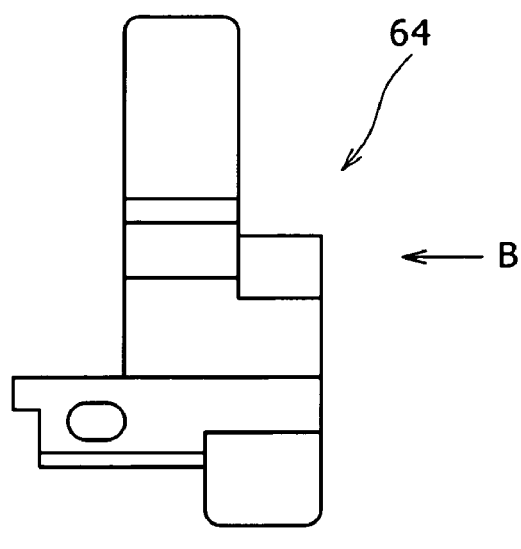
FIG. 37A is a front elevational view of a second arm member.
Figure 37B:
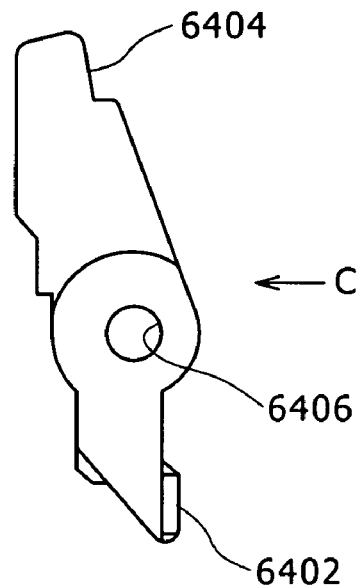
FIG. 37B is a view of the second arm member as viewed in the direction indicated by the arrow B in FIG. 37A.
Figure 37C:
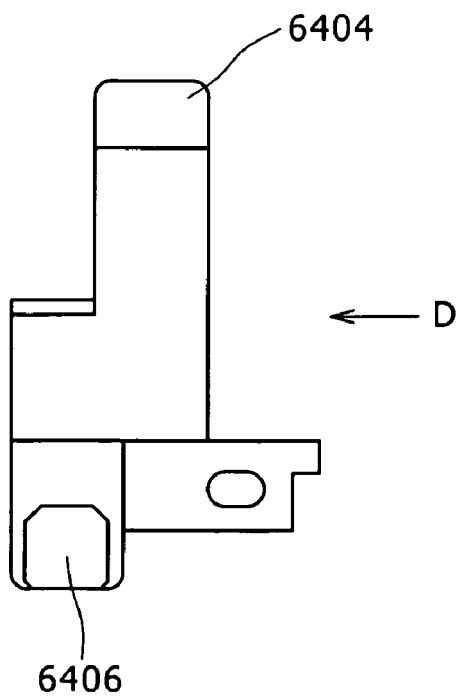
FIG. 37C is a view of the second arm member as viewed in the direction indicated by the arrow C in FIG. 37B.
Figure 37D:
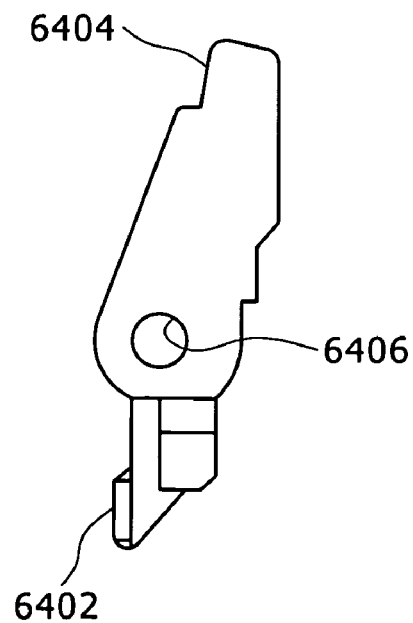
FIG. 37D is a view of the second arm member as viewed in the direction indicated by the arrow D in FIG. 37C.

As shown in FIGS. 33 through 35, the cam plate 66 has a disk 6602 having gear teeth on its outer circumferential edge which are held in mesh with a final gear of the gear train 70, a hole 6603 defined in central bosses on both upper and lower surfaces of the disk 6602, the pivot shaft 6601 (see FIG. 32) being rotatably inserted in the hole 6603, a first triangular cam 6604 projecting on and extending along an outer circumferential edge of the upper surface of the disk 6602, and a second triangular cam 6606 projecting on and extending along an outer circumferential edge of the lower surface of the disk 6602. The first cam 6604 and the second cam 6606 are angularly spaced 180° from each other in the circumferential direction of the disk 6602. The upper and lower surfaces of the disk 6602 comprise flat surfaces 6608 except regions where the first cam 6604 and the second cam 6606 are positioned.

Detecting rods 6610 project from the upper surface of the disk 6602 in the axial direction thereof in angular alignment with the highest crests of the first cam 6604 and the second cam 6606.

Figure 19:
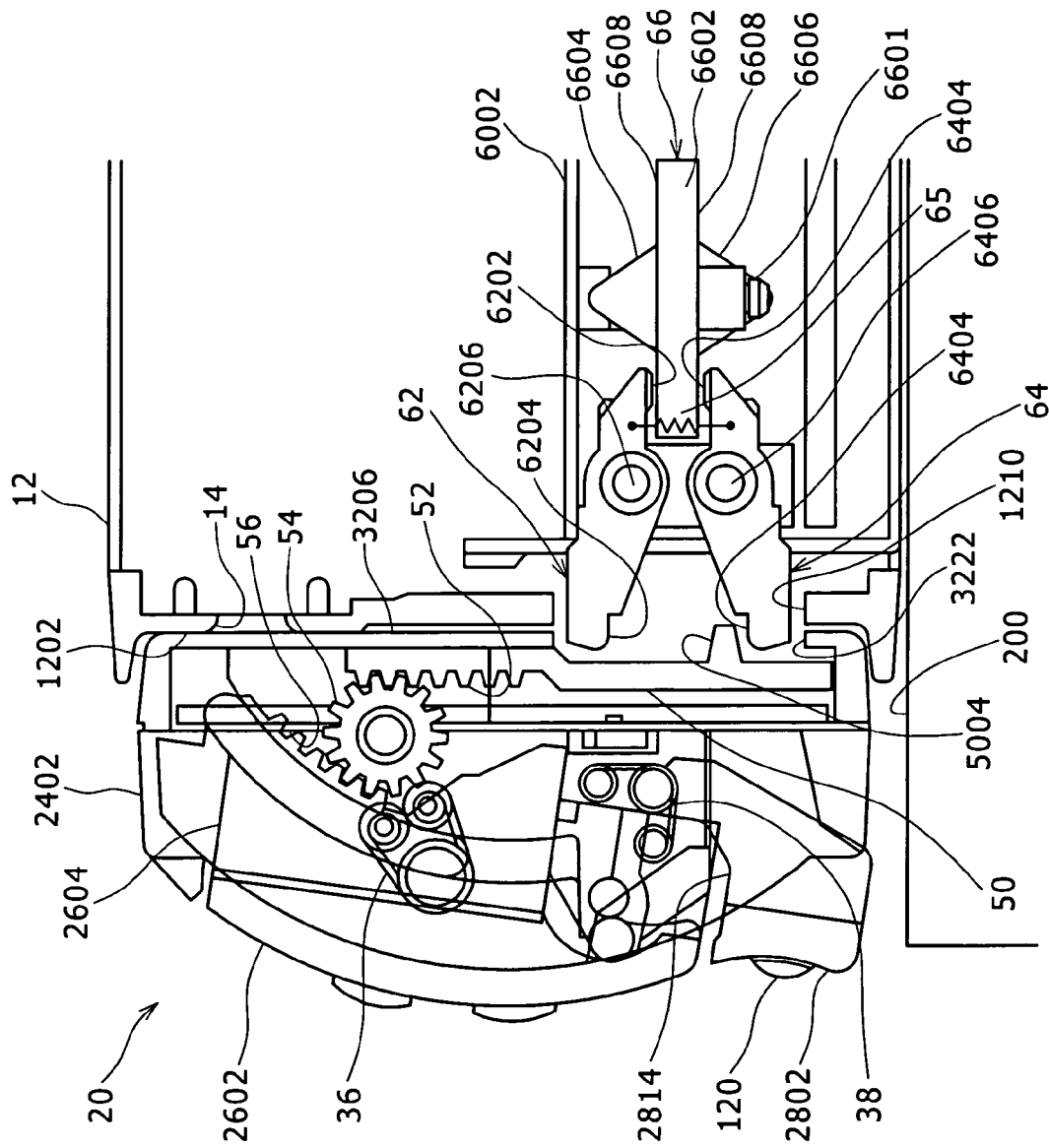
FIG. 19 is a view illustrating the manner in which the upper member and the lower member operate.

As shown in FIG. 19, the cam plate 66 is mounted on the mount frame 6002 by the pivot shaft 6601 which is inserted upwardly through the central boss on the lower surface of the disk 6602 and has an upper end fastened to the mount frame 6602 by a screw.

As shown in FIGS. 19, 32, and 36A to 36D, the first arm 62 has a longitudinal intermediate portion swingably supported on the mount frame 6002 by a horizontal shaft 6206, and the second arm 64 has a longitudinal intermediate portion swingably supported on the mount frame 6002 by a horizontal shaft 6406.

The first arm 62 has a proximal end 6202 engageable with the first cam 6604 of the cam plate 66 and a distal end 6204 positioned in the opening 1210.

As shown in FIGS. 19, 32, and 37A to 37D, the second arm 64 has a proximal end 6402 engageable with the second cam 6606 of the cam plate 66 and a distal end 6404 positioned in the opening 1210.

The first and second arms 62, 64 are normally urged to move the proximal ends 6202, 6402 into abutment against the disk 6602 and to move the distal ends 6204, 6404 away from each other.

When the proximal ends 6202, 6402 of the first and second arms 62, 64 are held in engagement with the respective flat surfaces 6608 of the cam plate 66, the distal ends 6204, 6404 are most widely spaced from each other, as shown in FIG. 19.

If the front panel assembly 20 is then coupled to the front face 1202 of the casing body 12, the distal end 6204 of the first arm 62 enters the recess 3222 and is positioned above the ridge 5004, and the distal end 6404 of the second arm 64 enters the recess 3222 and is positioned below the ridge 5004. Thus, regardless of whether the upper member 26 is in the upper position or the lower position, the ridge 5004 is positioned between the distal end 6204 of the first arm 62 and distal end 6404 of the second arm 64.

The rotational drive power of the motor 68 is transmitted through the gear train 70 to the cam plate 66, rotating the cam plate 66. When the proximal end 6202 of the first arm 62 is engaged by the first cam 6604, the distal end 6204 of the first arm 62 is turned downwardly in the opening 1210 by the first cam 6604. As the proximal end 6202 of the first arm 62 moves past the crest of the first cam 6604, the distal end 6204 of the first arm 62 is turned upwardly. When the proximal end 6202 of the first arm 62 is engaged by the flat surface 6608, the distal end 6204 of the first arm 62 remains still vertically.

While the proximal end 6202 of the first arm 62 being engaged by the first cam 6604, the proximal end 6402 of the second arm 64 is engaged by the flat surface 6608, and the distal end 6404 of the second arm 64 remains still vertically.

The rotational drive power of the motor 68 is further transmitted through the gear train 70 to the cam plate 66, rotating the cam plate 66. When the proximal end 6402 of the second arm 64 is engaged by the second cam 6606, the distal end 6404 of the second arm 64 is turned upwardly in the opening 1210 by the second cam 6606. As the proximal end 6402 of the second arm 64 moves past the crest of the second cam 6606, the distal end 6404 of the second arm 64 is turned downwardly. When the proximal end 6402 of the second arm 64 is engaged by the flat surface 6608, the distal end 6404 of the second arm 64 remains still vertically.

While the proximal end 6402 of the second arm 64 being engaged by the second cam 6606, the proximal end 6202 of the first arm 62 is engaged by the flat surface 6608, and the distal end 6204 of the first arm 62 remains still vertically.

During rotation of the cam plate 66, therefore, the first and second arms 62, 64 cycle successively through a state in which the first and second arms 62, 64 are vertically spaced from each other, a state in which only the first arm 62 is turned vertically, a state in which the first and second arms 62, 64 are vertically spaced from each other, and a state in which only the second arm 64 is turned vertically.

As shown in FIG. 32, a position detecting switch 6004 is mounted on the mount frame 6002 for detecting the two detecting rods 6610. The position detecting switch 6004 is arranged to detect either one of the two detecting rods 6610 when both the proximal ends 6202, 6402 of the first and second arms 62, 64 are positioned on the flat surfaces 6608 of the cam plate 66.

Figure 38:
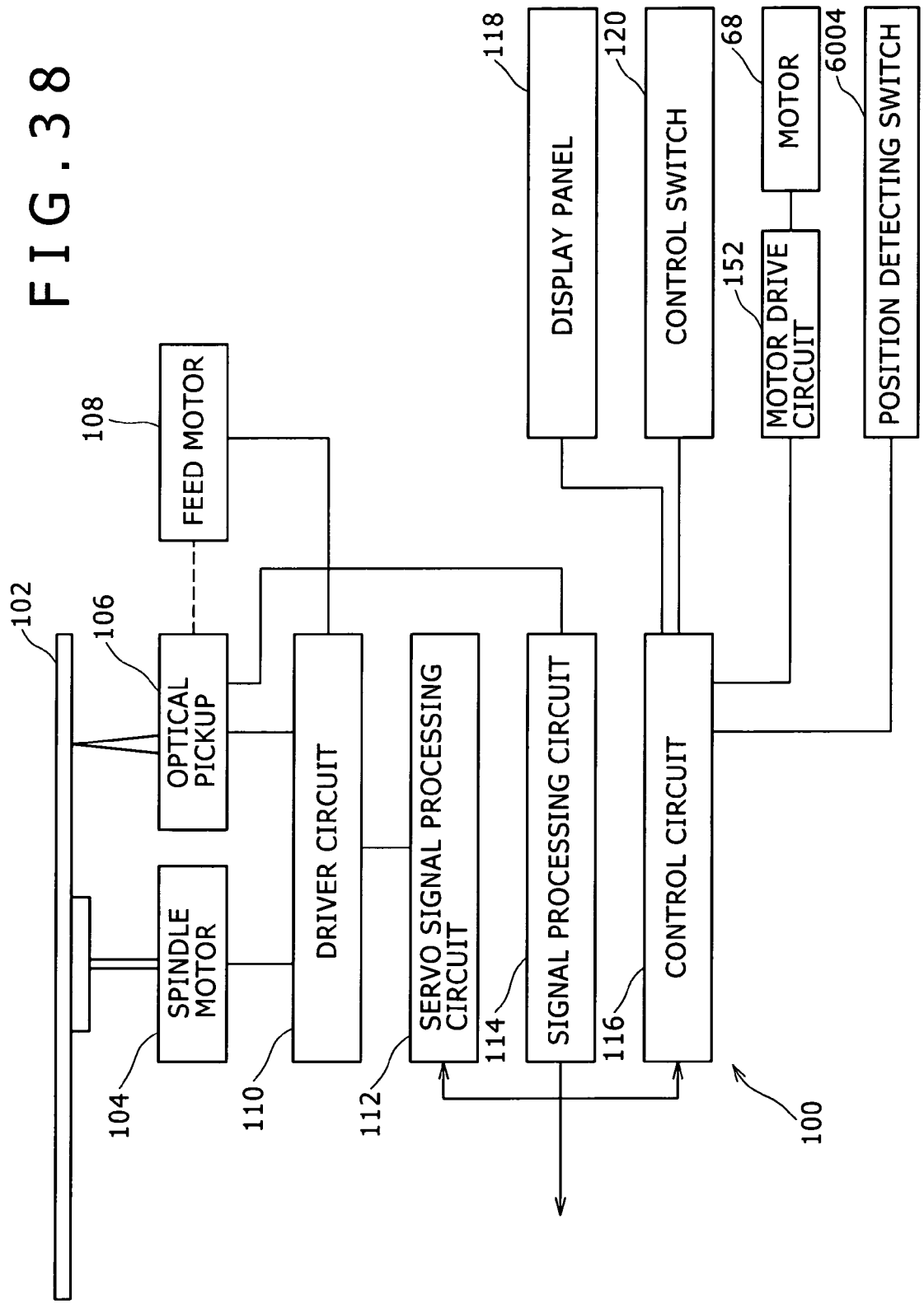
FIG. 38 is a block diagram of a control system of the vehicle-mounted electronic device.

FIG. 38 shows in block form a control system of the vehicle-mounted electronic device 100.

The control system of the vehicle-mounted electronic device 100 will be described below with reference to FIG. 38. The vehicle-mounted electronic device 100 has a spindle motor 104 as actuating means for rotating an optical disk 102 (corresponding to a recording medium as claimed) such as a CD, a DVD, or the like, an optical pickup 106 for applying a light beam to the optical disk 102, detecting a reflected light beam from the optical disk 102, and generating a tracking error signal, a focusing error signal, a synchronizing signal, and a reproduced signal, and a feed motor 108 as actuating means for moving the optical pick up 106 radially across the optical disk 102.

The vehicle-mounted electronic device 100 also has a driver circuit 110, a servo signal processing circuit 112, a signal processing circuit 114, a control circuit 116, a display panel 118, a plurality of control switches 120, a motor 68, a position detecting switch 6004, and a motor driver circuit 152.

The driver circuit 110 supplies drive signals to the spindle motor 104, the feed motor 108, and actuators for the optical pickup 106 under the control of the servo signal processing circuit 112.

The signal processing circuit 114 amplifies and demodulates a reproduced signal supplied from the optical pickup 106 to reproduce audio and video information recorded on the optical disk 102, and outputs audio and video signals to speakers and a display monitor.

The signal processing circuit 114 also amplifies and processes a tracking error signal and a focusing error signal which are supplied from the optical pickup 106, and supplies the tracking error signal and the focusing error signal to the servo signal processing circuit 112.

The servo signal processing circuit 112 controls the driver circuit 110 to control a drive signal that is supplied from the driver circuit 110 to the spindle motor 104, thereby controlling rotation of the spindle motor 104.

The servo signal processing circuit 112 also controls the driver circuit 110 to control a drive signal that is supplied from the driver circuit 110 to the feed motor 108, thereby controlling the movement of the optical pickup 106 in radial directions of the optical disk 102 (seek mode).

The servo signal processing circuit 112 also controls the driver circuit 110 based on the tracking error signal and the focusing error signal that are supplied from the signal processing circuit 114 to control drive signals for a tracking actuator and a focusing actuator that are supplied from the driver circuit 110 to the optical pickup 106, thereby performing a tracking servo control process and a focusing servo control process.

The control circuit 116 serves to control the servo signal processing circuit 112 and the signal processing circuit 114.

The control circuit 116 also controls the display panel 118 to display various items of information with respect to operation of the vehicle-mounted electronic device 100.

Furthermore, based on control signals supplied from the control switches 120, the control circuit 116 controls the servo signal processing circuit 112 and the signal processing circuit 114 to control operation of the vehicle-mounted electronic device 100.

The motor driver circuit 152 is controlled by the control circuit 116 to supply a drive signal to the motor 68.

The control circuit 116 controls the motor driver circuit 152 to control rotation of the motor 68 based on a control signal that is supplied from an on/off control switch which is one of the control switches 120, and a detected signal supplied from the position detecting switch 6004.

Operation of the front panel assembly 20 mounted on the front face 1202 of the casing body 12 will be described below with reference to FIGS. 19 through 25. In FIGS. 19 through 25, the reference numeral 200 represents the dashboard of an automobile which incorporates the vehicle-mounted electronic device 100.

First, it is assumed that the recording medium insertion slot 14 is closed.

As shown in FIG. 19, the motor 68 is de-energized by the control circuit 116, and the distal end 6204 of the first arm 62 and the distal end 6404 of the second arm 64 are most widely spaced from each other.

With the front panel assembly 20 being mounted on the front face 1202 of the casing body 12, the ridge 5004 of the slide member 50 is positioned between the distal end 6204 of the first arm 62 and the distal end 6404 of the second arm 64 through the recess 3222 and the opening 1210.

As shown in FIG. 19, the upper panel 2602 is positioned in the upper position and the lower panel 2802 is positioned in the erected position. The recording medium insertion slot 14 is closed by the upper panel 2602, and the ridge 5004 is positioned in the recess 3222 closely to the lower end thereof. At this time, the opening 2404 is closed by the front face 2603 of the upper panel 2602 and the front face 2803 of the lower panel 2802, and remains closed by the first toggle mechanism and the second toggle mechanism.

Since the display surface 118A of the display panel 118 faces forwardly, the user can see the display surface 118A. Since the front face 2803 of the lower panel 2802 faces substantially forwardly, the user can operate the control switches 120. Therefore, the user can use the car audio system by seeing the display surface 118A and operating the control switches 120.

The user is now going to open the recording medium insertion slot 14.

When the user operates the on/off control switch (the control switches 120), the control circuit 116 energizes the motor 68. It is assumed that the motor 68 rotates in one direction.

Figure 20:
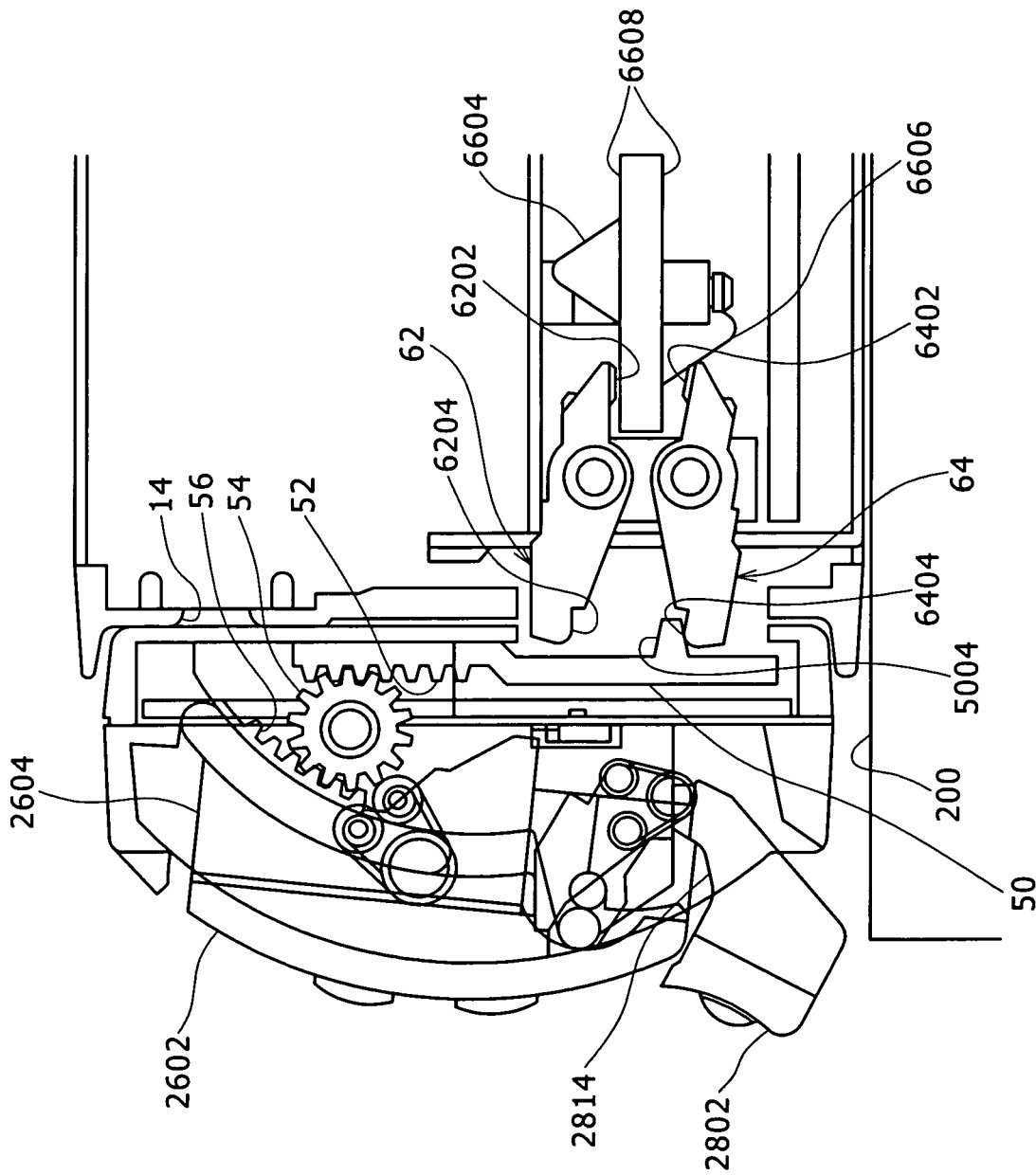
FIG. 20 is a view illustrating the manner in which the upper member and the lower member operate.
Figure 21:
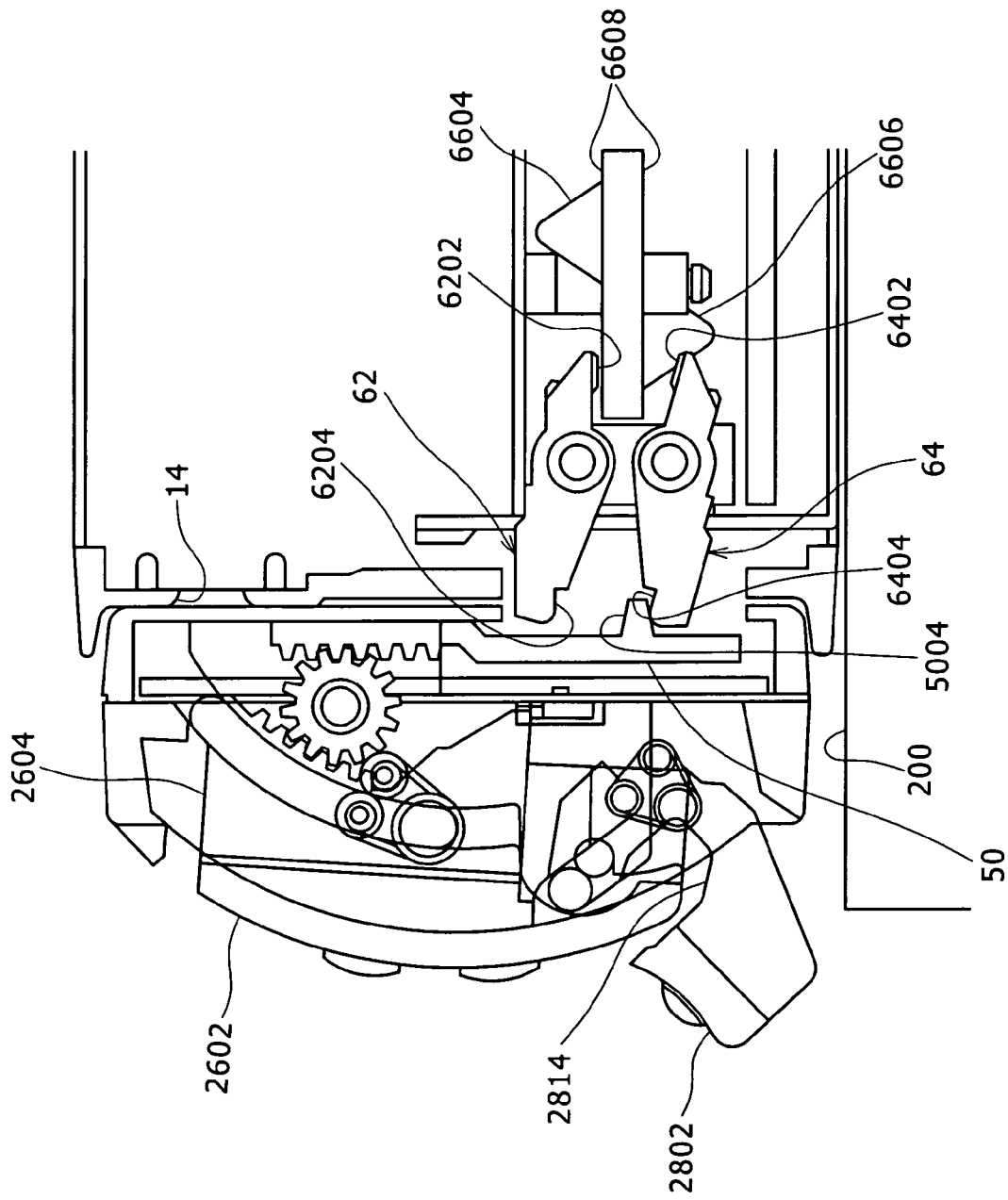
FIG. 21 is a view illustrating the manner in which the upper member and the lower member operate.
Figure 22:
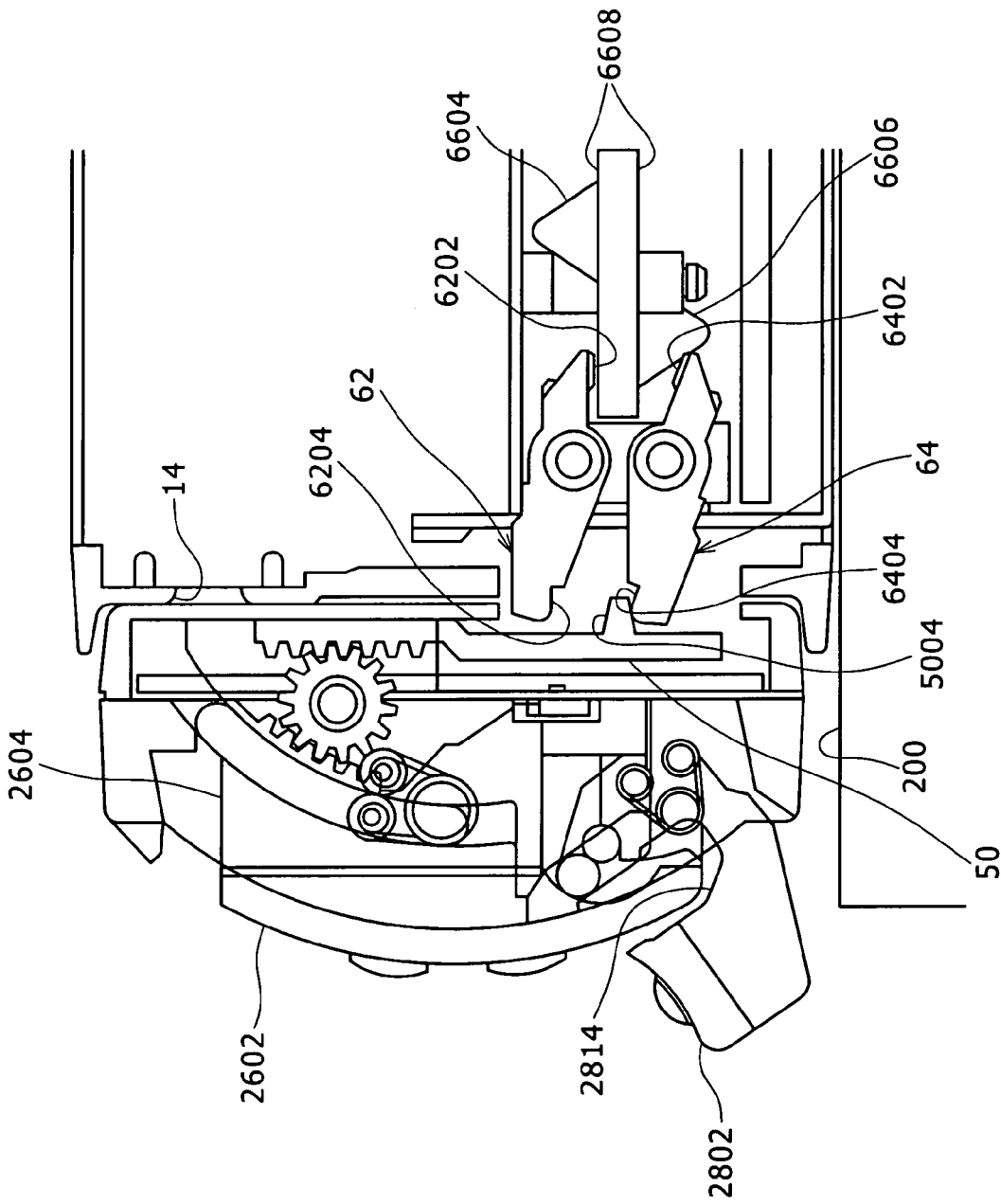
FIG. 22 is a view illustrating the manner in which the upper member and the lower member operate.
Figure 23:
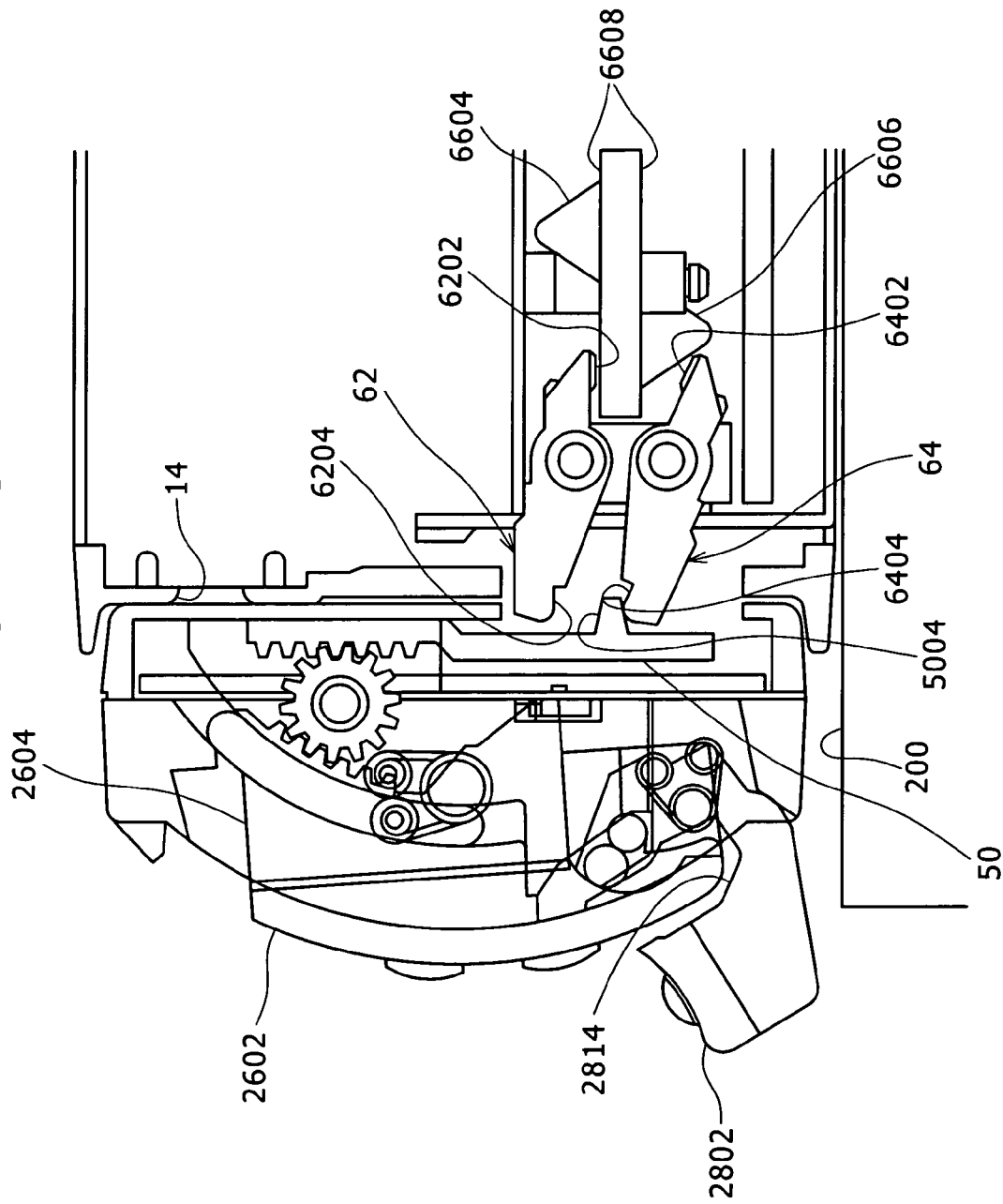
FIG. 23 is a view illustrating the manner in which the upper member and the lower member operate.
Figure 24:
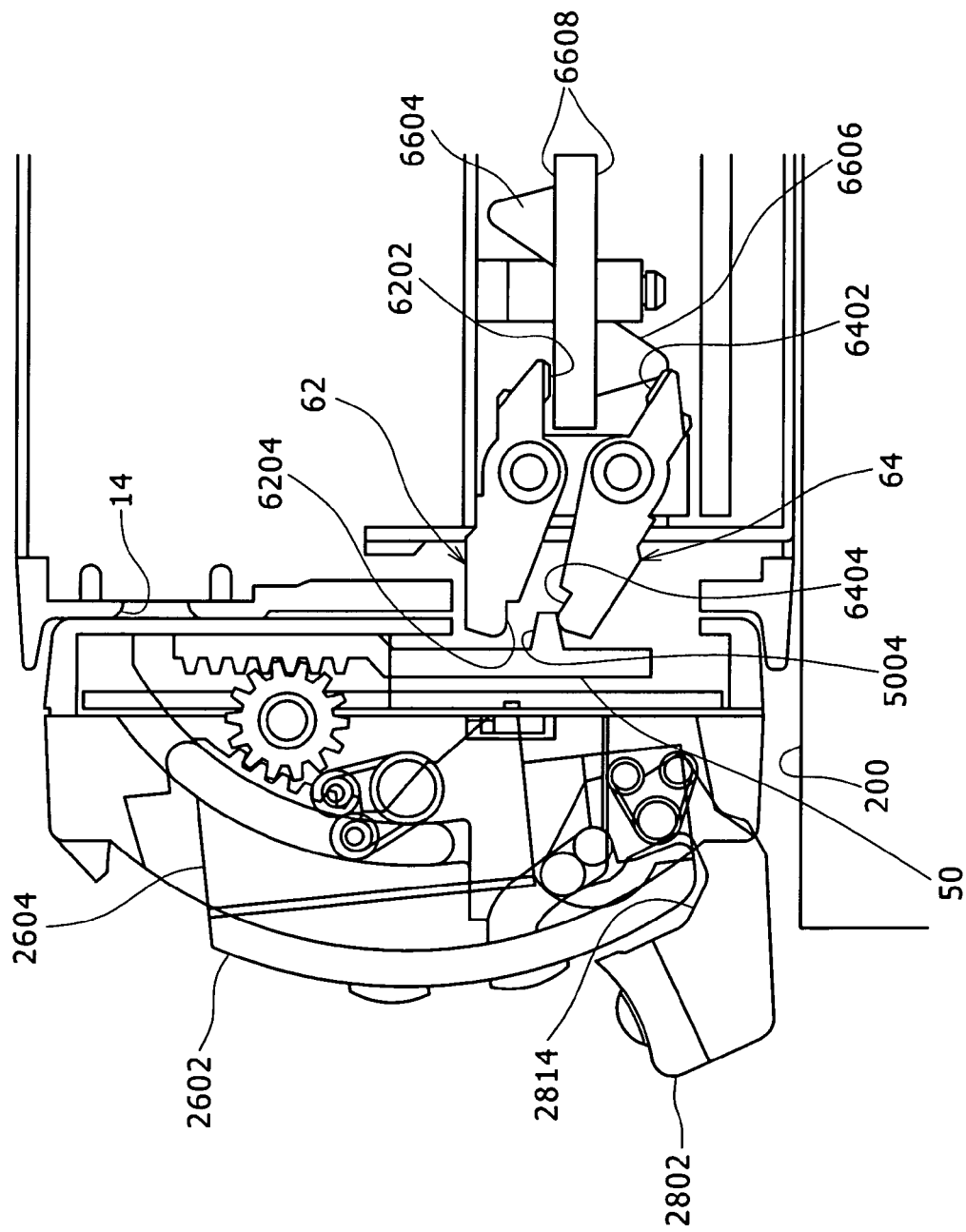
FIG. 24 is a view illustrating the manner in which the upper member and the lower member operate.

The cam plate 66 is rotated until the proximal end 6402 of the second arm 64 is engaged by the second cam 6606, whereupon, as shown in FIG. 20, the distal end 6404 of the second arm 64 is turned upwardly. The distal end 6404 of the second arm 64 engages the ridge 5004 and moves the ridge 5004 upwardly, displacing the slide member 50 upwardly.

The upper member 26 is moved downwardly by the slide member rack 52, the pinion 54, and the lid rack 56 while the ridges 2616 are being guided by the first guide grooves 34A. The lower member 28 is turned forwardly about the pivot shafts 2622 as the knobs 2818 are guided along the second guide grooves 34B upon vertical movement of the upper member 26.

Until the proximal end 6402 of the second arm 64 reaches the crest of the second cam 6606, the upper panel 2602 moves toward the lower position and the lower panel 2802 swings forwardly toward the inclined position successively through positions shown in FIGS. 21 through 24.

Figure 25:
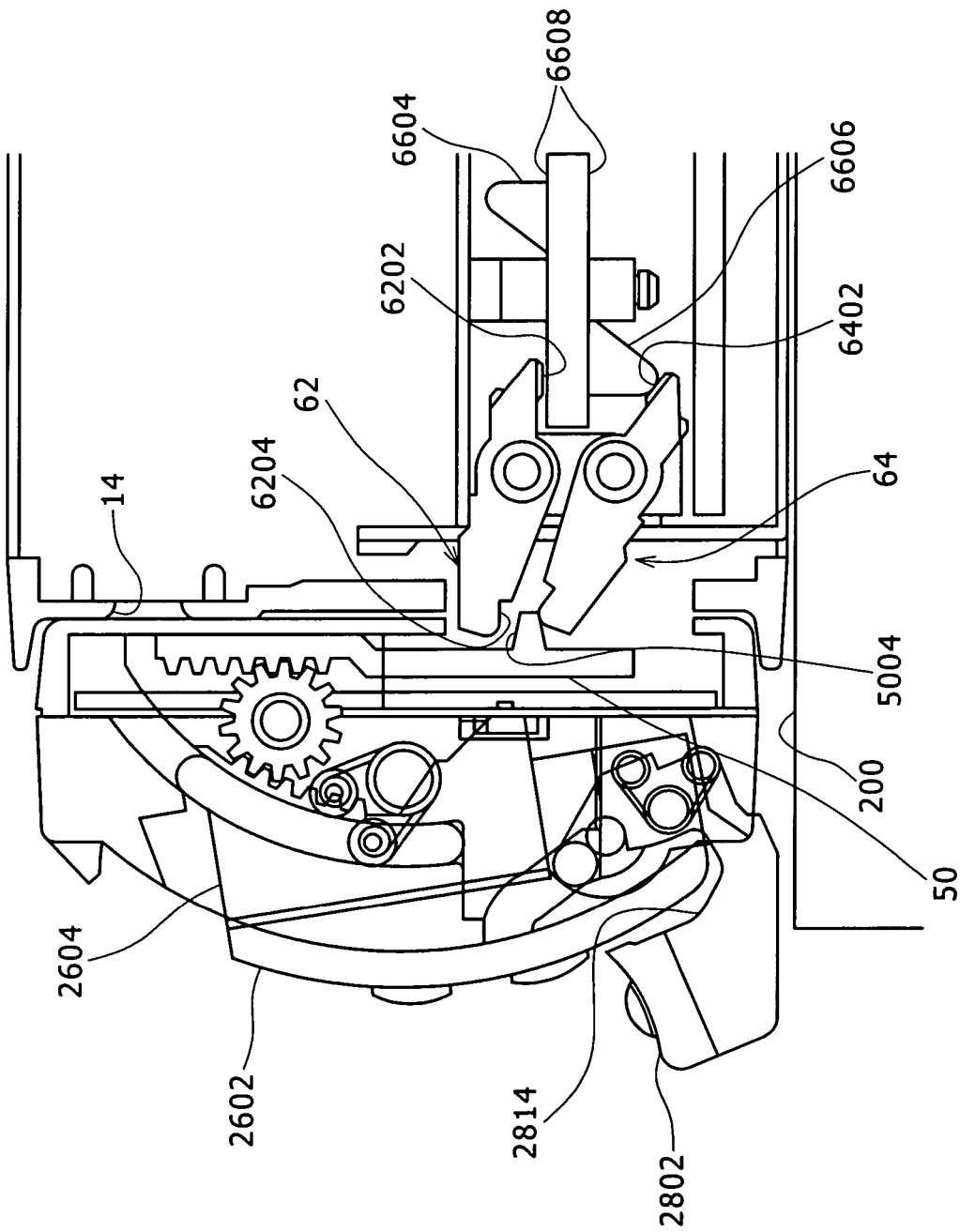
FIG. 25 is a view illustrating the manner in which the upper member and the lower member operate.

When the proximal end 6402 of the second arm 64 reaches the crest of the second cam 6606, as shown in FIG. 25, the lower portion of the upper panel 2602 is accommodated in the panel accommodating groove 2814, and the upper panel 2602 reaches the lower position and the lower panel 2802 reaches the inclined position. The upper edge of the opening 2404 and the upper wall 2604 of the upper panel 2602 are spaced from each other, opening the recording medium insertion slot 14 to allow a recording medium to be inserted or removed.

The recording medium insertion slot 14 remains open by the first toggle mechanism and the second toggle mechanism.

As the motor 68 further rotates, the proximal end 6402 of the second arm 64 moves beyond the crest of the second cam 6606. The distal end 6404 of the second arm 64 is moved downwardly away from the ridge 5004.

When the proximal end 6402 of the second arm 64 is released from the second cam 6606 and engages the flat surface 6608, as shown in FIG. 19, the distal ends 6204, 6404 of the first and second arms 62, 64 are most widely spaced from the ridge 5004. When one of the detecting rods 6610 of the cam plate 66 is detected by the position detecting switch 6004, the control circuit 116 de-energizes the motor 68.

At this time, since the display surface 118A of the display panel 118 faces forwardly though it is oriented slightly obliquely downwardly, the display surface 118A can be visually recognized without fail by the user. Since the front face 2803 of the lower panel 2802 faces forwardly though it is oriented obliquely upwardly, the control switches 120 can be operated by the user. Therefore, the user can use the car audio system by seeing the display surface 118A and operating the control switches 120 even though the recording medium insertion slot 14 is open.

As shown in FIGS. 19 and 25, in both the upper position and the lower position, the upper member 26 is kept within the contour of the front face 1202 of the casing body 12 as viewed from the front side of the casing body 12, and in both the erected position and the inclined position, the lower member 28 is kept within the contour of the front face 1202 of the casing body 12 as viewed from the front side of the casing body 12. Consequently, both the upper member 26 and the lower member 28 do not interfere with the dashboard 200. Therefore, the vehicle-mounted electronic device 100 can be installed without the need for a large installation space.

Then, the user is going to close the recording medium insertion slot 14 which has been open.

As shown in FIG. 25, when the user operates the on/off control switch which is one of the control switches 120 while the recording medium insertion slot 14 is being open, the motor 68 is energized by the control circuit 116.

The cam plate 66 is rotated until the proximal end 6202 of the first arm 62 is engaged by the first cam 6604, whereupon the distal end 6204 of the first arm 62 is turned downwardly. The distal end 6204 of the first arm 62 engages the ridge 5004 and moves the ridge 5004 downwardly, displacing the slide member 50 downwardly.

The upper member 26 is moved upwardly by the slide member rack 52, the pinion 54, and the lid rack 56 while the ridges 2616 are being guided by the first guide grooves 34A. The lower member 28 is turned rearwardly about the pivot shafts 2622 as the knobs 2818 are guided along the second guide grooves 34B upon vertical movement of the upper member 26.

Until the proximal end 6202 of the first arm 62 reaches the crest of the first cam 6604, the upper panel 2602 moves toward the lower position and the lower panel 2802 swings rearwardly toward the erected position.

When the proximal end 6202 of the first arm 62 reaches the crest of the first cam 6604, the upper panel 2602 reaches the upper position and the lower panel 2802 reaches the erected position. The recording medium insertion slot 14 is closed by the upper panel 2602, and the opening 2404 is closed by the upper panel 2602 and the lower panel 2802.

The recording medium insertion slot 14 and the opening 2404 remain closed by the first toggle mechanism and the second toggle mechanism.

As the motor 68 further rotates, the proximal end 6202 of the first arm 62 moves beyond the crest of the first cam 6604. The distal end 6204 of the first arm 62 is moved downwardly away from the ridge 5004.

When the proximal end 6202 of the first arm 62 is released from the first cam 6604 and engages the flat surface 6608, as shown in FIG. 19, the distal ends 6204, 6404 of the first and second arms 62, 64 are most widely spaced from the ridge 5004. When the other one of the detecting rods 6610 of the cam plate 66 is detected by the position detecting switch 6004, the control circuit 116 de-energizes the motor 68.

As a result, the components return to the position shown in FIG. 25.

Besides opening and closing the recording medium insertion slot 14 by operating the on/off control switch, the recording medium may be ejected by operating an ejection switch for ejecting the optical disk 102, and the motor 68 may be energized to open the recording medium insertion slot 14.

The motor 68 for operating the actuating mechanism 60 may be dedicated to the actuating mechanism 60. However, any of various other drive sources may be used to operate the actuating mechanism 60. For example, if the vehicle-mounted electronic device 100 has a loading mechanism for inserting and removing the optical disk 102 and the loading mechanism has a motor, then the cam plate 66 may be rotated by the drive power generated by the motor of the loading mechanism. According to such a modification, the motor 68 of the actuating mechanism 60 may be dispensed with, and the number of parts and the size of the vehicle-mounted electronic device 100 may be reduced.

According to the present embodiment, in the electronic device wherein the front panel assembly 20 is detachably mounted on the front face 1202 of the casing body 12, the slide member 50 is mounted on the rear face 3206 of the front panel assembly 20, and the interlink mechanism is provided for moving the upper member 26 in directions to open and close the recording medium insertion slot 14 when the slide member 50 is reciprocally moved. Therefore, with the simple mechanism being provided in the casing body 12 for reciprocally moving the slide member 50, the recording medium insertion slot 14 can selectively be opened and closed, and the arrangement disposed in the casing body 12 for opening and closing the recording medium insertion slot 14 is simplified.

According to the present embodiment, furthermore, when the motor 68 is de-energized, the distal ends 6204, 6404 of the first and second arms 62, 64 are most widely spaced from each other, and regardless of the vertical position of the ridge 5004 of the slide member 50, or stated otherwise, regardless of whether the upper member 26 is in the upper position or the lower position, the ridge 5004 and the distal ends 6204, 6404 do not interfere with each other, allowing the front panel assembly 20 to be smoothly and reliably mounted on and dismounted from the casing body 12. Therefore, when the front panel assembly 20 is mounted on and dismounted from the casing body 12, the user is not required to be concerned about whether the upper member 26 of the front panel assembly 20 is in the upper position or the lower position, and finds it easy to use the vehicle-mounted electronic device 100.

When the motor 68 is de-energized, as shown in FIG. 19, since the distal ends 6204, 6404 of the first and second arms 62, 64 are most widely spaced from the ridge 5004, the upper member 26 can be forcibly manually moved from the upper position to the lower position or from the lower position to the upper position, so that the recording medium insertion slot 14 can manually be opened and closed.

According to the present embodiment, furthermore, inasmuch as the ridge 5004 of the slide member 50 projects from the bottom of the cavity 5006, when the distal ends 6204, 6404 of the first and second arms 62, 64 are positioned in the cavity 5006, the ridge 5004 and the distal ends 6204, 6404 of the first and second arms 62, 64 can be reliably brought into engagement with each other, and the distance that the ridge 5004 projects from the rear face 3206 of the front panel assembly 20 and the distance that the distal ends 6204, 6404 of the first and second arms 62, 64 project from the front face 1202 of the casing body 12 are reduced, so that the front panel assembly 20 and the casing body 12 can be reduced in size.

Operation of the engaging fingers 3212 and the engaging and disengaging mechanism 18 for mounting the front panel assembly 20 on and dismounting the front panel assembly 20 from the front face 1202 of the casing body 12 will be described below.

Figure 26:
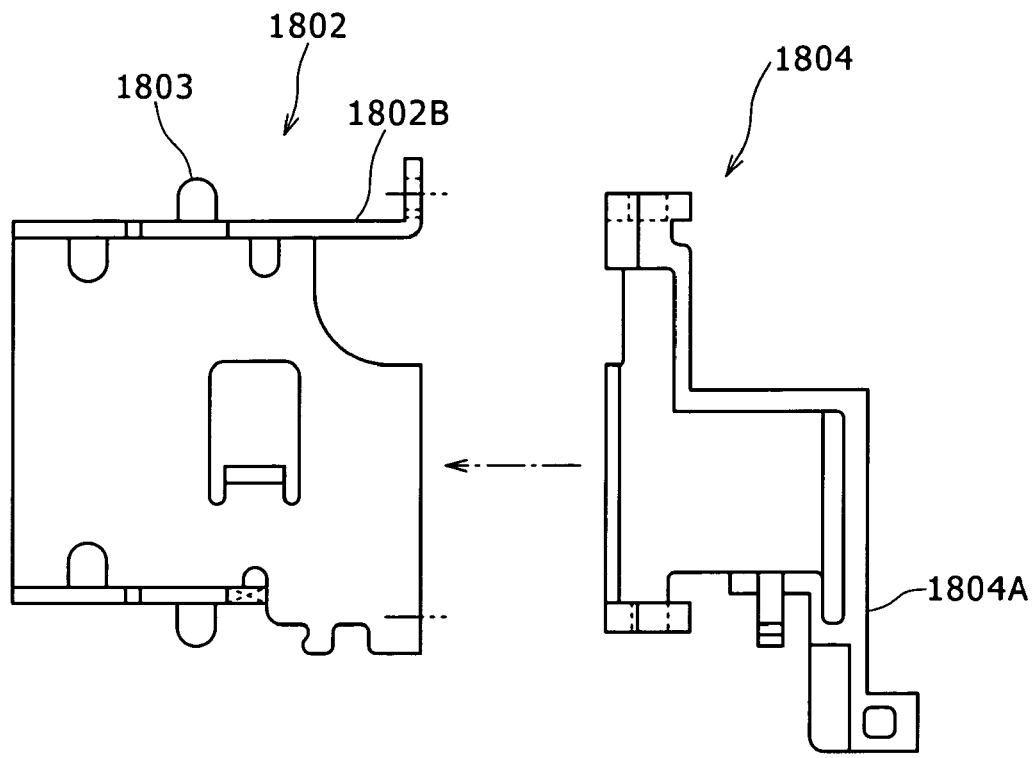
FIG. 26 is a front elevational view of a bracket and a release lever of an engaging and disengaging mechanism disposed in a front portion of the casing body.
Figure 27:
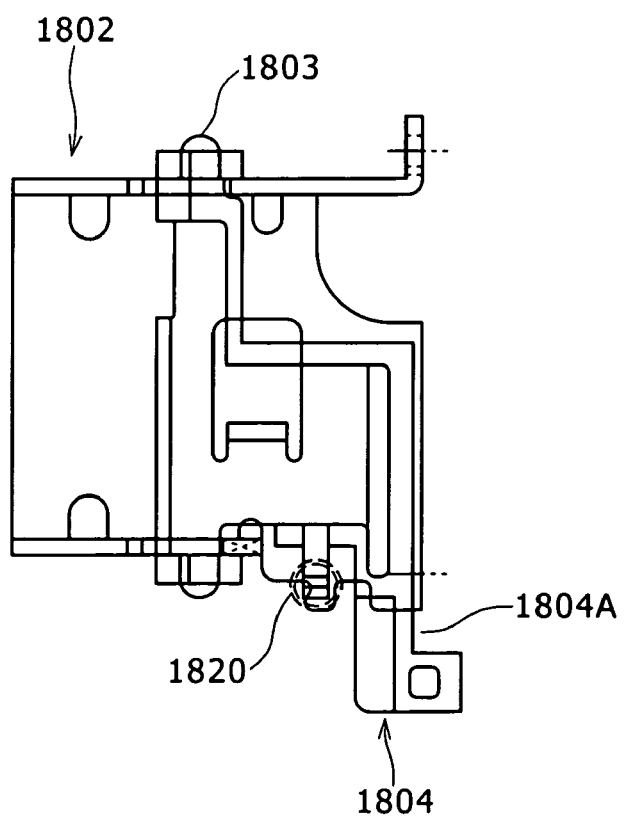
FIG. 27 is a front elevational view of the bracket and the release lever which are assembled together.

As shown in FIGS. 26 and 27, the engaging and disengaging mechanism 18 has a bracket 1802 fixed to the casing body 12 and a release lever 1804 supported on the bracket 1802 for leftward and rightward swinging movement about support shafts 1803. The release lever 1804 is normally urged to move in a closing direction by a spring 1820.

Figure 28:
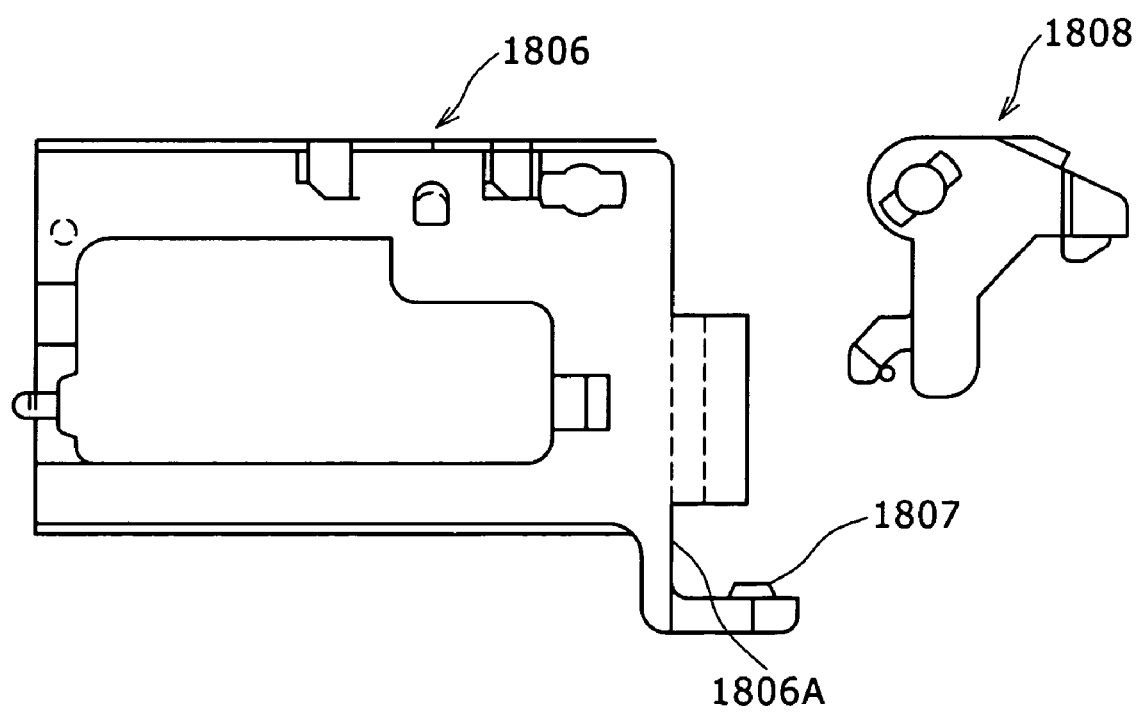
FIG. 28 is a front elevational view of a slide member and a movable finger.
Figure 29A:
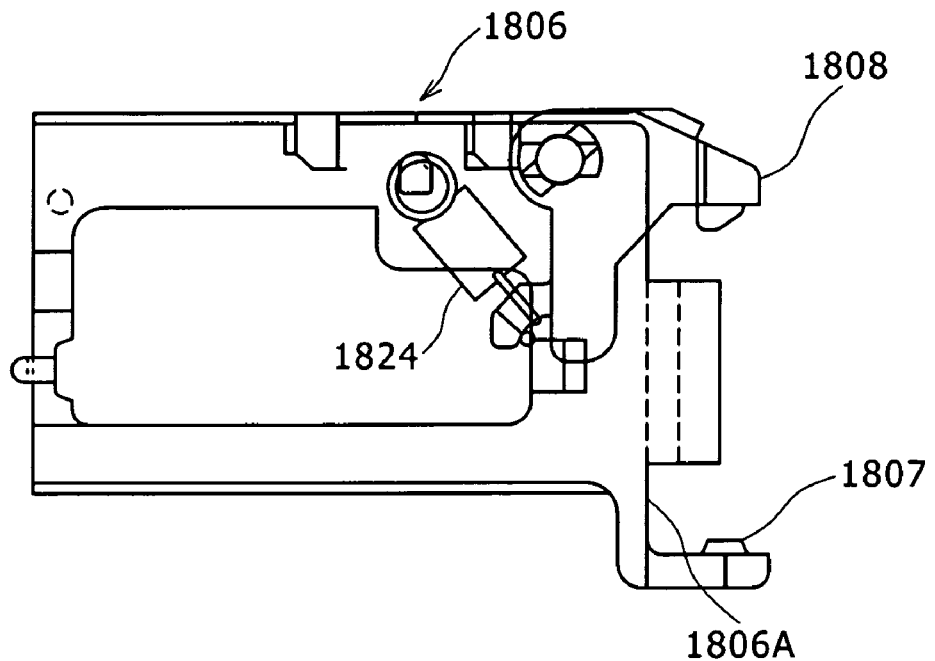
FIGS. 29A and 29B are front elevational views of the slide member and the movable finger which are assembled together.
Figure 29B:
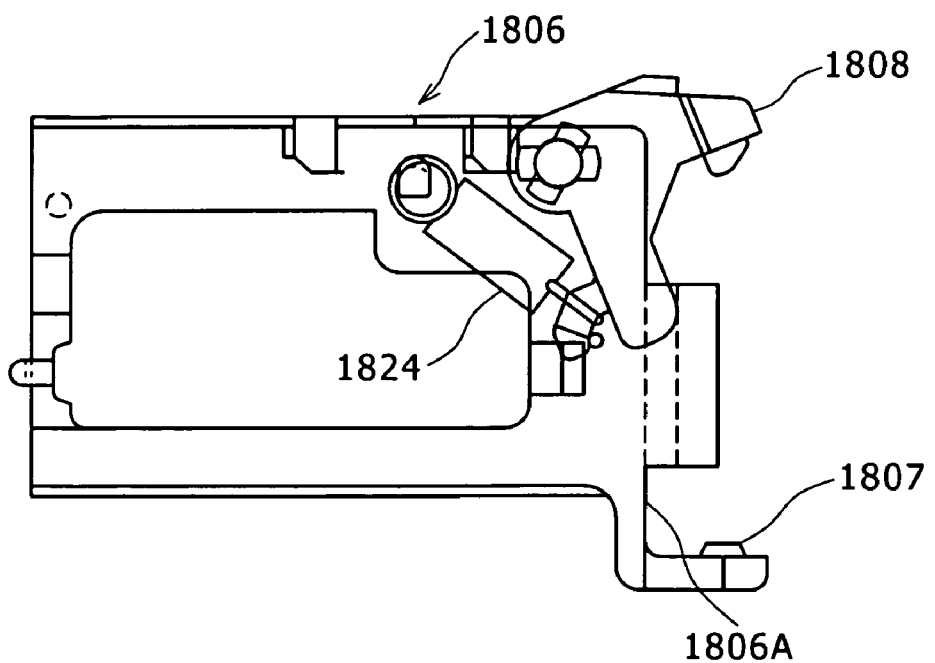
Figure 30A:
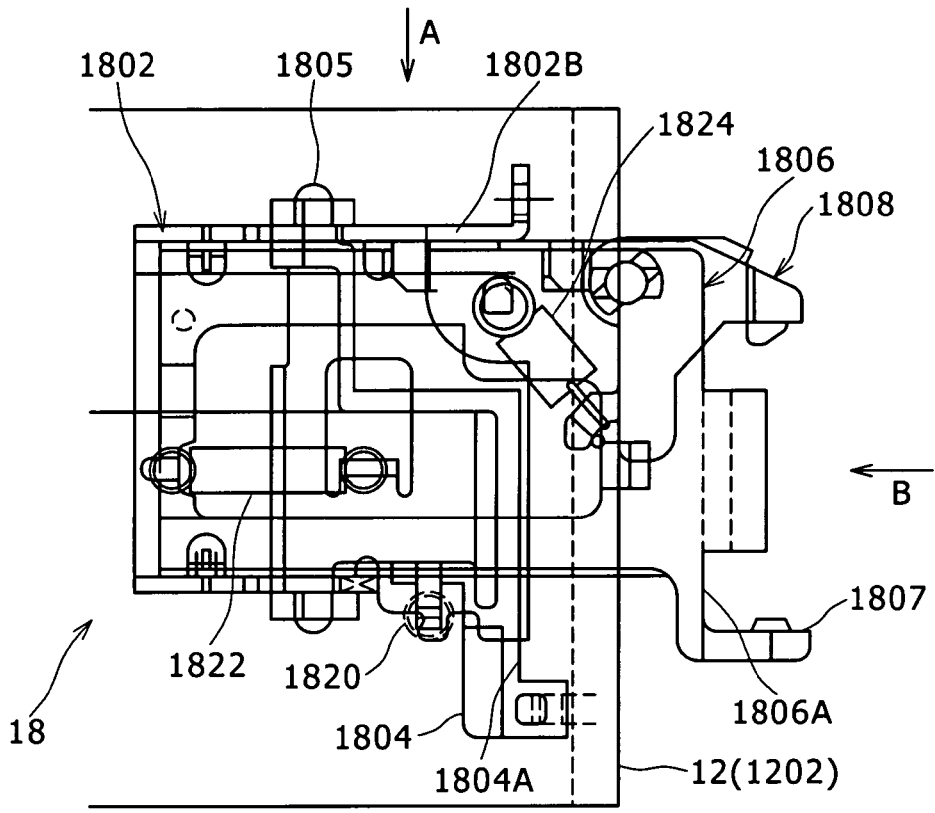
FIG. 30A is a front elevational view of the engaging and disengaging mechanism in a locked state and FIG. 30B is a front elevational view of the engaging and disengaging mechanism in an unlocked state.
Figure 30B:
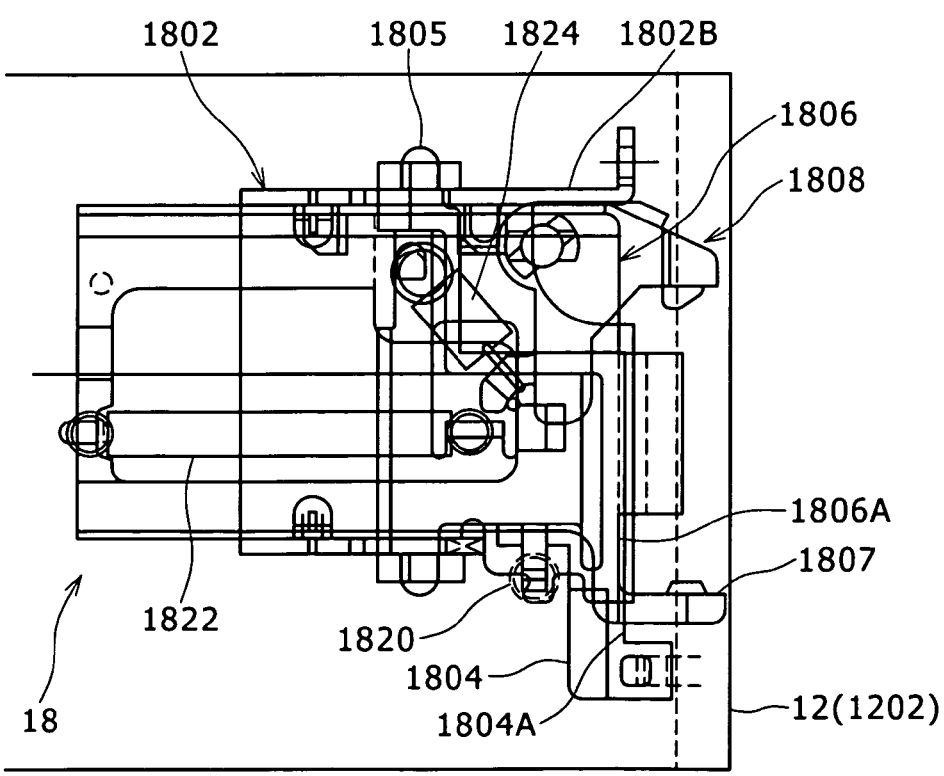
Figure 31A:
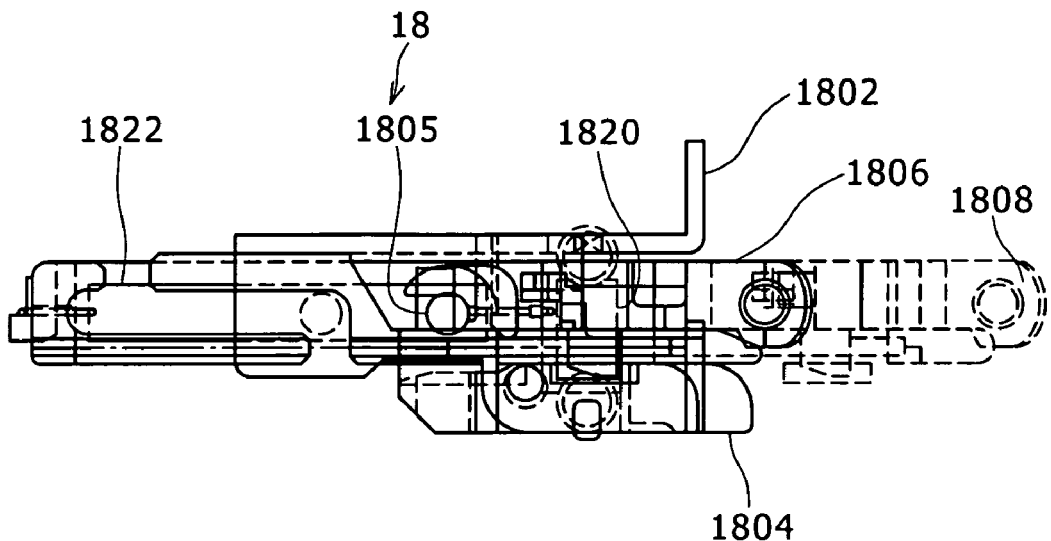
FIG. 31A is a view of the engaging and disengaging mechanism as viewed in the direction indicated by the arrow A in FIG. 30A
Figure 31B:
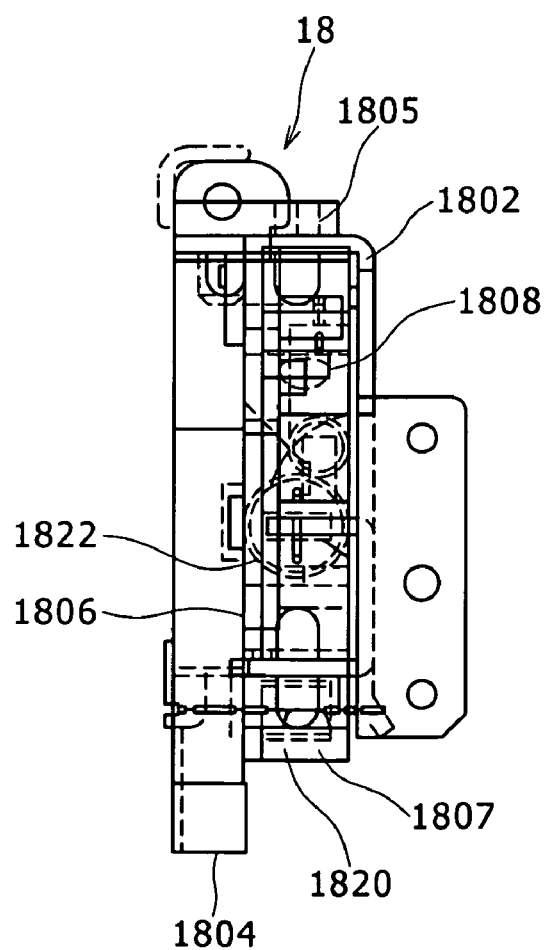
FIG. 31B is a view of the engaging and disengaging mechanism as viewed in the direction indicated by the arrow B in FIG. 30B.

As shown in FIGS. 28, 29A and 29B, a slide member 1806 is supported on the bracket 1802 for forward and rearward sliding movement thereon. As shown in FIGS. 30A and 30B, the slide member 1806 is normally urged to project from the front face 1202 of the casing body 12 by a spring 1822.

As shown in FIGS. 29A and 29B, the slide member 1802 has a fixed finger 1807 and a vertically swingable movable finger 1808 which are vertically spaced from each other. The movable finger 1808 is normally urged to move in a closing direction by a spring 1824.

For mounting the front panel assembly 20 on the front face 1202 of the casing body 12, the rear face 3206 of the rear frame 32 is brought closely to the front face 1202 of the casing body 12, and the positioning teeth 1206 (see FIG. 2) are caused to engage in the recesses 3214 (see FIG. 3B), connecting the panel assembly connector 3211 to the casing body connector 16 and bringing the engaging fingers 3212 into engagement with the fixed finger 1807 and the movable finger 1808. The movable finger 1808 is opened against the bias of the spring 1824, engages the engaging fingers 3212, and then is closed, whereupon the engaging fingers 3212 are engaged by the fixed finger 1807 and the movable finger 1808.

When the front panel assembly 20 is applied to the front face 1202 of the casing body 12, the slide member 1806 is retracted on the bracket 1802, opening the release lever 1804. When the slide member 1806 reaches a retracted position, an engaging portion 1804A of the release lever 1804 engages a front face 1806A of the slide member 1806, holding the slide member 1806 in the retracted position. With the slide member 1806 being kept in the retracted position, the movable finger 1808 abuts against an upper wall 1806B of the bracket 1806 against disengagement from the engaging fingers 3212. The front panel assembly 20 is now mounted on the front face 1202 of the casing body 12.

For detaching the front panel assembly 20 from the front face 1202 of the casing body 12, a release button 2002 (see FIGS. 1A and 1B) on the front frame 24 is pressed. The tip end of the release button 2002 presses the release lever 1804 to open the release lever 1804, and the slide member 1806 is moved forwardly under the bias of the spring 1822, positioning the fixed finger 1807 and the movable finger 1808 in front of the front face 1202 of the casing body 12. The user opens the movable finger 1808 to release the engaging fingers 3212 out of engagement with the fixed finger 1807 and the movable finger 1808, and removes the front panel assembly 20 from the front face 1202 of the casing body 12.

The engaging and disengaging mechanism for mounting the front panel assembly 20 on and dismounting the front panel assembly 20 from the front face 1202 of the casing body 12 is not limited to the above structural details, but may be of any of various known structures. The engaging and disengaging mechanism 18 allows the user to remove the front panel assembly 20 from the casing body 12 depending on the environment in which the user is going to leave the car unattended.

In the illustrated embodiment, the recording medium insertion slot 14 serves to insert an optical disk as a disk-shaped recording medium. However, the recording medium insertion slot 14 may be used to insert any of various other recording mediums such as a memory card or the like.

In the illustrated embodiment, the interlink mechanism for moving the lid in the directions to open and close the recording medium insertion slot 14 when the slide member 50 is reciprocally moved is constructed of the slide member rack 52, the pinion 54, and the lid rack 56. However, the interlink mechanism is not limited to those structural details, but may be constructed using any of various known mechanisms such as a cam mechanism, a link mechanism, etc.

In the illustrated embodiment, the engaging member for engaging the ridge 5004 to reciprocally moving the slide member 50 vertically is constructed of the first arm 62 and the second arm 64 which are separate members different from each other. However, the engaging member may be of any desired structure and shape such as a member having a vertically elongate engaging groove accommodating the ridge 5004 therein.

In the illustrated embodiment, the actuating mechanism 60 for actuating the engaging member is constructed of the cam plate 66 having the first cam 6604 and the second cam 6606. However, the actuating mechanism 60 is not limited to those structural details, but may be constructed using any of various known mechanisms such as a planetary gear mechanism, a link mechanism, etc.

In the illustrated embodiment, the electric device has been described as including a car audio system. However, the electric device is not limited to an electric device for use on motor vehicles.

Although a certain preferred embodiment of the present invention has been shown and described in detail, it should be understood that various changes and modifications may be made therein without departing from the scope of the appended claims.

What is claimed is:

1. A front panel assembly to detachably mount on a front face of a casing body of an electronic device, said front face having a recording medium insertion slot, comprising:
   a panel frame to detachably mount on the front face of the casing body, the panel frame including a horizontally elongated slot corresponding to the recording medium insertion slot in the front face;
   a lid supported on said panel frame to move in directions to open and close said recording medium insertion slot via said horizontally elongated slot while said panel frame is mounted on the front face of the casing body;
   a rear face of said panel frame to face the front face of the casing body while said panel frame is mounted on the front face of the casing body;
   a slide member mounted on said rear face to reciprocate movement along said rear face; and
   an interlink mechanism mounted on said panel frame to move said lid in the directions to open and close said recording medium insertion slot via the horizontally elongated slot in response to reciprocating movement of said slide member.

2. The front panel assembly according to claim 1, wherein each of said panel frame and said lid has an elongated shape a predetermined height and a predetermined width greater than said predetermined height, said slide member being reciprocally movable in the direction of said height.

3. The front panel assembly according to claim 1, wherein said rear face has an elongated recess defined in a portion on which said slide member is mounted, said slide member having a body supported in said panel frame to reciprocate movement along the direction in which said recess is elongated and a ridge projecting from said body and disposed in said recess, and when said slide member is reciprocally moved, said ridge is reciprocally moved in said recess along the direction in which said recess is elongated.

4. The front panel assembly according to claim 1, wherein said rear face has an elongated recess defined in a portion on which said slide member is mounted, said slide member having a body supported in said panel frame to reciprocate movement along the direction in which said recess is elongated and a ridge projecting from said body and disposed in said recess, and when said slide member is reciprocally moved, said ridge is reciprocally moved in said recess along the direction in which said recess is elongated; and
   wherein when said ridge is at a position spaced closely to an end of said recess in the direction in which said recess is elongated, said lid closes said recording medium insertion slot via said horizontally elongated slot, and when said ridge is at a position spaced closely to the other end of said recess in the direction in which said recess is elongated, said lid opens said recording medium insertion slot via said horizontally elongated slot.

5. The front panel assembly according to claim 1, wherein said rear face has an elongated recess defined in a portion on which said slide member is mounted, said slide member having a body supported in said panel frame to reciprocate movement along the direction in which said recess is elongated, a cavity defined in a portion of said body which faces said recess, and a ridge projecting from a bottom of said cavity and disposed in said recess, and when said slide member is reciprocally moved, said bottom of the cavity and said ridge are reciprocally moved in said recess along the direction in which said recess is elongated.

6. The front panel assembly according to claim 1, wherein said interlink mechanism includes a slide member rack extending on said slide member along the directions in which said slide member is reciprocally movable, a lid rack extending on said lid along the directions in which said lid is movable, and a pinion rotatably supported on said panel frame and held in mesh with said slide member rack and said lid rack.

7. The front panel assembly according to claim 1, wherein said front face of the casing body is horizontally elongated, said recording medium insertion slot extends horizontally in an upper portion of said front face, and said front panel assembly has an upper member and a lower member mounted on said panel frame, said upper member having a horizontally elongated upper panel and a horizontally elongated lower panel disposed below said upper panel and coupled to a lower portion of said upper panel to swing about a horizontally extending axis, said front panel assembly further comprising:
   a support mechanism supporting said upper member to move said upper panel between an upper position in which said upper panel closes said recording medium insertion slot and a lower position in which said upper panel opens said recording medium insertion slot;
   wherein said interlink mechanism causes said lower member to swing outward and inward about said axis in response to vertical movement of said upper member, to bring said lower panel into an erected position in which said lower panel extends continuously downward from a lower end of said upper panel when said upper panel is in said upper position, and to position an upper end of said lower panel forward of a lower portion of said upper panel to bring said lower panel into an inclined position in which said lower panel faces obliquely upward when said upper panel is in said lower position; and
   wherein said lid includes said upper member and said lower member.

8. The front panel assembly according to claim 1, wherein said lid has a front face facing outward of the front panel assembly, further comprising:
   a display panel to display operating states of said vehicle-mounted electronic device, said display panel having a display surface mounted on said front face of the lid; and
   control keys to control said vehicle-mounted electronic device, said control keys being mounted on said front face of the lid.

9. The front panel assembly according to claim 1, wherein said lid has a front face facing outward of the front panel assembly, further comprising:
- a display panel to display operating states of said vehicle-mounted electronic device, said display panel having a display surface mounted on said front face of the lid;
- control keys to control said vehicle-mounted electronic device, said control keys being mounted on said front face of the lid;
- an engaging and disengaging mechanism mounted on said front face of the casing body;
- a casing body connector mounted on said front face of the casing body and electrically connected to an electric circuit accommodated in said casing body;
- an engaging finger mounted on said panel frame to detachably engage said engaging and disengaging mechanism; and
- a panel assembly connector to detachably connect to said casing body connector to transmit an electric signal between said electric circuit and the front panel assembly through said casing body connector.

10. A casing of a vehicle-mounted electronic device, comprising:
- a casing body having a recording medium insertion slot defined in a front face;
- a front panel assembly to detachably mount on the front face of said casing body;
- a panel frame included on said front panel assembly, said panel frame detachably mounting on said front face of the casing body, said panel frame including a horizontally elongated slot corresponding to said recording medium insertion slot in said front face;
- a lid supported on said panel frame to move in directions to open and close said recording medium insertion slot via said horizontally elongated slot while said panel frame is mounted on the front face of the casing body;
- a rear face of said panel frame to face the front face of the casing body while said panel frame is mounted on the front face of the casing body;
- a slide member mounted on said rear face to reciprocate movement along said rear face; and
- an interlink mechanism mounted on said panel frame to move said lid in the directions to open and close said recording medium insertion slot via said horizontally elongated slot in response to reciprocating movement of said slide member.

11. A casing of a vehicle-mounted electronic device, comprising:
- a casing body having a recording medium insertion slot defined in a front face;
- a front panel assembly to detachably mount on the front face of said casing body;
- a panel frame included on said front panel assembly, said panel frame detachably mounting on said front face of the casing body, said panel frame including a horizontally elongated slot corresponding to said recording medium insertion slot in said front face;
- a lid supported on said panel frame to move in directions to open and close said recording medium insertion slot via said horizontally elongated slot while said panel frame is mounted on the front face of the casing body;
- a rear face of said panel frame to face the front face of the casing body while said panel frame is mounted on the front face of the casing body;
- a slide member mounted on said rear face to reciprocate movement along said rear face;
- an interlink mechanism mounted on said panel frame to move said lid in the directions to open and close said recording medium insertion slot via said horizontally elongated slot in response to reciprocating movement of said slide member;
- an engaging member mounted on said front face of the casing body to engage said slide member while said front panel assembly is connected to said casing body; and
- an actuating mechanism mounted on said casing body to reciprocally move said engaging member in directions to reciprocally move said slide member.

12. The casing according to claim 11, further comprising:
- an engaging element mounted on said slide member to engage said engaging member;
- a first and second arm of said engaging member disposed in said casing body, said first arm being spaced from said second arm along the directions in which said slide member is reciprocally moved;
- said first and second arms having respective distal portions exposed on said front face of the casing body;
- wherein while said front panel assembly is connected to said casing body, the distal portions of said first and second arms are positioned away from said engaging element in respective opposite directions along the directions in which said slide member is reciprocally moved, and the distal portions of said first and second arms are selectively moved toward said engaging element by said actuating mechanism to reciprocally move said slide member.

13. The casing according to claim 11, further comprising:
- an engaging element mounted on said slide member to engage said engaging member;
- a first and a second arm of said engaging member disposed in said casing body, said first arm being spaced from said second arm along the directions in which said slide member is reciprocally moved;
- said first and second arms having respective distal portions exposed on said front face of the casing body;
- wherein while said front panel assembly is connected to said casing body, the distal portions of said first and second arms are positioned away from said engaging element in respective opposite directions along the directions in which said slide member is reciprocally moved;
- said actuating mechanism having a rotatable cam plate having a first cam disposed on a surface to engage said first arm and a second cam disposed on another surface to engage said second arm;
- wherein when said cam plate is rotated, said first and second arms are selectively turned by said first and second cams, respectively, to selectively move the distal portions of said first and second arms toward said engaging element to reciprocally move said slide member.

14. The casing according to claim 11, wherein said rear face has an elongated recess defined in a portion on which said slide member is mounted, said slide member having a body supported in said panel frame to reciprocate movement along the direction in which said recess is elongated, and a ridge projecting from said body and disposed in said recess, and when said slide member is reciprocally moved, said ridge is reciprocally moved in said recess along the direction in which said recess is elongated, said engaging member including a first arm and a second arm which are disposed in said casing body where said first arm is spaced from said second arm along the directions in which said slide member is reciprocally moved; and
wherein while said front panel assembly is connected to said casing body, respective distal portions of said first and second arms are positioned in said recess away from said ridge in respective opposite directions along the directions in which said slide member is reciprocally moved, and the distal portions of said first and second arms are selectively moved toward said ridge by said actuating mechanism, to reciprocally move said slide member.

15. The casing according to claim 11,
wherein said rear face has an elongated recess defined in a portion on which said slide member is mounted, said slide member having a body supported in said panel frame to reciprocate movement along the direction in which said recess is elongated and a ridge projecting from said body and disposed in said recess, wherein when said slide member is reciprocally moved, said ridge is reciprocally moved in said recess along the direction in which said recess is elongated;
wherein when said ridge is at a position spaced closely to an end of said recess in the direction in which said recess is elongated, said lid closes said recording medium insertion slot, and when said ridge is at a position spaced closely to the other end of said recess in the direction in which said recess is elongated, said lid opens said recording medium insertion slot, said engaging member including a first arm and a second arm which are disposed in said casing body where said first arm is spaced from said second arm along the directions in which said slide member is reciprocally moved; and
wherein while said front panel assembly is connected to said casing body, respective distal portions of said first and second arms are positioned in said recess away from said ridge in respective opposite directions along the directions in which said slide member is reciprocally moved, and the distal portions of said first and second arms are selectively moved toward said ridge by said actuating mechanism to reciprocally move said slide member.

16. The casing according to claim 11,
wherein said rear face has an elongated recess defined in a portion on which said slide member is mounted, said slide member having a body supported in said panel frame to reciprocate movement along the direction in which said recess is elongated, a cavity defined in a portion of said body which faces said recess, and a ridge projecting from a bottom of said cavity and disposed in said recess, and when said slide member is reciprocally moved, said bottom of the cavity and said ridge are reciprocally moved in said recess along the direction in which said recess is elongated, said engaging member including a first arm and a second arm which are disposed in said casing body where said first arm is spaced from said second arm along the directions in which said slide member is reciprocally moved; and
wherein while said front panel assembly is connected to said casing body, respective distal portions of said first and second arms are positioned in said recess and said cavity away from said ridge in respective opposite directions along the directions in which said slide member is reciprocally moved, and the distal portions of said first and second arms are selectively moved toward said ridge by said actuating mechanism to reciprocally move said slide member.

17. The casing according to claim 11,
wherein said interlink mechanism includes a slide member rack extending on said slide member along the directions in which said slide member is reciprocally movable, a lid rack extending on said lid along the directions in which said lid is movable, and a pinion rotatably supported on said panel frame and held in mesh with said slide member rack and said lid rack.

18. The casing according to claim 11,
wherein said front face of the casing body is horizontally elongated, said recording medium insertion slot extends horizontally in an upper portion of said front face, and said front panel assembly has an upper member and a lower member mounted on said panel frame, said upper member having a horizontally elongated upper panel and a horizontally elongated lower panel disposed below said upper panel and coupled to a lower portion of said upper panel to swing about a horizontally extending axis, said front panel assembly further comprising:
a support mechanism supporting said upper member to move said upper panel between an upper position in which said upper panel closes said recording medium insertion slot and a lower position in which said upper panel opens said recording medium insertion slot;
wherein said interlink mechanism causes said lower member to swing outward and inward about said axis in response to vertical movement of said upper member, bringing said lower panel into an erected position in which said lower panel extends continuously downward from a lower end of said upper panel when said upper panel is in said upper position, and positioning an upper end of said lower panel forward of a lower portion of said upper panel to bring said lower panel into an inclined position in which said lower panel faces obliquely upward when said upper panel is in said lower position; and
wherein said lid includes said upper member and said lower member.

19. The casing according to claim 11,
wherein said lid has a front face facing outward of the front panel assembly, further comprising:
a display panel to display operating states of said vehicle-mounted electronic device, said display panel having a display surface mounted on said front face of the lid; and
control keys to control said vehicle-mounted electronic device, said control keys being mounted on said front face of the lid.

20. The casing according to claim 11,
wherein said lid has a front face facing outward of the front panel assembly, further comprising:
a display panel to display operating states of said vehicle-mounted electronic device, said display panel having a display surface mounted on said front face of the lid;
control keys to control said vehicle-mounted electronic device, said control keys being mounted on said front face of the lid;
an engaging and disengaging mechanism mounted on said front face of the casing body;
a casing body connector mounted on said front face of the casing body and electrically connected to an electric circuit accommodated in said casing body;
an engaging finger mounted on said panel frame to detachably engage said engaging and disengaging mechanism; and
a panel assembly connector to detachably connect to said casing body connector to transmit an electric signal between said electric circuit and the front panel assembly through said casing body connector.

* * * * *